United States Patent
Yanagisawa et al.

(10) Patent No.: US 6,901,102 B1
(45) Date of Patent: May 31, 2005

(54) SELF-COMPENSATING LASER RESONATOR

(75) Inventors: Takayuki Yanagisawa, Tokyo (JP); Yoshihito Hirano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,315

(22) Filed: May 22, 2000

(30) Foreign Application Priority Data

Feb. 22, 2000 (JP) ........................................ 2000-044511

(51) Int. Cl.[7] ................................................ H01S 3/08
(52) U.S. Cl. ............................................ 372/98; 372/99
(58) Field of Search ................................ 372/58, 93, 98, 372/99, 19, 95, 108, 9; 356/437; 359/330

(56) References Cited

U.S. PATENT DOCUMENTS

| | | | | |
|---|---|---|---|---|
| 3,624,531 A | * | 11/1971 | Norris et al. .................. | 372/93 |
| 4,677,639 A | * | 6/1987 | Sasser .......................... | 372/93 |
| 4,731,788 A | * | 3/1988 | Shoshan ...................... | 372/106 |
| 4,757,511 A | * | 7/1988 | Klingel, Hans et al. ...... | 372/58 |
| 4,910,746 A | * | 3/1990 | Nicholson .................... | 372/103 |
| 5,052,017 A | * | 9/1991 | Hobart et al. ................. | 372/99 |
| 5,148,443 A | * | 9/1992 | Du et al. ...................... | 372/107 |
| 5,321,718 A | * | 6/1994 | Waarts et al. ................ | 359/326 |
| 5,684,812 A | * | 11/1997 | Shih ............................. | 372/19 |
| 5,923,695 A | * | 7/1999 | Patel et al. ................... | 372/75 |
| 5,936,993 A | * | 8/1999 | Opower et al. ............... | 372/93 |
| 6,084,682 A | * | 7/2000 | Zare et al. .................... | 356/43 |
| 6,208,424 B1 | * | 3/2001 | de Groot ...................... | 359/326 |
| 6,288,832 B1 | * | 9/2001 | Richman et al. ............. | 359/326 |

FOREIGN PATENT DOCUMENTS

| | | |
|---|---|---|
| JP | 11201900 A | 7/1999 |
| JP | A11201900 | 7/1999 |

OTHER PUBLICATIONS

Koechner, Springer Series in Optical Sciences, vol. 1, No. 4, pp. 197, 227–229, no date.
Solid–State Laser Engineering 4th Ed., vol. 1, Germany, 1995, pp. 197; 227–229, W. Koechner, Springer Series in Optical Sciences.

* cited by examiner

Primary Examiner—Paul Ip
Assistant Examiner—Hung T. Vy
(74) Attorney, Agent, or Firm—Birch, Stewart, Kolasch & Birch, LLP

(57) ABSTRACT

A standing wave self-compensating laser resonator for preventing the utilization efficiency of a laser beam from being lowered, while at the same time, improving the quality of the laser beam wherein, a first reflecting apparatus 21 having first and second reflecting surfaces 21a, 21b disposed at a right angle to each other and a second reflecting apparatus 22 having third and fourth reflecting surfaces 22a, 22b disposed at a right angle to each other face each other such that ridges 21c, 22c are orthogonal, a third reflecting apparatus 123 having two reflecting surfaces which are approximately parallel to and face from each other is provided between the second reflecting surface 21b and fourth reflecting surface 22b, a laser medium 23 is provided between the first reflecting surface 21a and third reflecting surface 22a, and the laser beam is not incident on the ridges 21c, 22c.

29 Claims, 17 Drawing Sheets

SELF-COMPENSATING LASER RESONATOR

BACKGROUND OF THE INVENTION

1. Field of the Invention

The present invention relates to a self-compensating laser resonator for compensating for the inclination of a reflecting surface, used in, for example, a solid-state laser apparatus which is provided in a flying object such as a satellite or aircraft.

2. Description of the Related Art

FIG. 26 is an explanatory drawing showing a conventional laser resonator shown in, for example, the Springer Series in Optical Sciences Vol. 1, "Solid-State Laser Engineering" Fourth Edition 1995, page 197. In FIG. 26 a pair of reflecting mirrors 1, 2 for confining a laser beam are disposed opposite each other, a laser medium 3 is disposed between reflecting mirrors 1 and 2, an excitation light source 4 excites the laser medium 3, 5 denotes a laser resonator optical axis, a laser beam optical path 6 extends from the reflecting mirror 2 to the reflecting mirror 1, a laser beam optical path 7 extends from the reflecting mirror 1 to the reflecting mirror 2.

Next, the operation will be explained. In a laser resonator structured as above, a laser beam travels back and forth along the optical paths 6, 7, and only the laser beam which travels back and forth along the same optical paths 6, 7 and maintains the same phase state is selectively confined and amplified so as to form an oscillation mode. When the reflecting mirrors 1 and 2 are disposed parallel to each other, the laser beam is repeatedly reflected between the reflecting mirrors 1 and 2 to travel back and forth along the optical paths 6, 7 which are parallel to the optical axis 5. At this time, the laser beam repeatedly passes through the laser medium 3, which is excited by the excitation light source 4, so as to be gradually amplified.

On the other hand, when the reflecting mirror 1 is inclined so that the reflecting mirrors 1 and 2 are not parallel, as shown in FIG. 27, the laser beam which travels along the optical path 6 parallel to the optical axis 5 is reflected along an optical path 8 at a angle relative to the optical axis 5. Accordingly, the laser beam does not travel back along the same optical path and an oscillation mode can not be formed.

As a means for overcoming this problem, a self-compensating laser resonator, such as that shown in FIG. 28, is also shown on page 227 of the above "Solid-State Laser Engineering." In FIG. 28, a roof prism 11 has a ridge 11a which is parallel to the Z axis, a roof prism 12 has a ridge 12a which is parallel to the X axis, a corner cube prism 13 is disposed facing the roof prisms 11 and 12, a laser medium 3 is disposed between the corner cube prism 13 and roof prism 11.

In a laser resonator constructed as above, a laser beam travels along an optical axis 14 and is reflected by the roof prism 12. The laser beam reflected by the roof prism 12 is bent back by the corner cube prism 13 and passes through the laser medium 3 excited by the excitation light source 4 so as to be amplified. The laser beam now amplified by the laser medium 3 is reflected by the roof prism 11 to be amplified again by the laser medium 3. Then, the laser returns to its original position so as to be confined inside the laser resonator.

Next, FIG. 29 is an explanatory drawing showing the reflected state of the laser beam incident upon the roof prism 12 of FIG. 28. In FIG. 29, reflecting surfaces 12b, 12c having the ridge 12a therebetween are set at a right angle to each other and form 45 degree angles with the optical axis 14. A laser beam, which travels along an optical path 15 parallel to the optical axis 14 to be incident upon the roof prism 12, is bent 90 degrees by the reflecting surface 12b and bent 90 degrees by the reflecting surface 12c so that the direction thereof is changed a total of 180 degrees. An optical path 16 of the laser beam reflected in this manner is parallel to the optical axis 14. That is, the roof prism 12 reflects the incident laser beam as a laser beam which is parallel to, and travels in the opposite direction of, the incident laser beam.

Also, as shown in FIG. 30, when the roof prism 12 is tilted an angle α with the ridge 12a as the center axis, the angle provided from the reflecting surface 12b is changed by 90+2α, where as the angle provided from the reflecting surface 12c is changed by 90−2α. Thus, the total change in angle between the laser beam traveling along the optical path 15 and the optical path 16 of the laser beam reflected by the roof prism 12 is 180 degrees. Accordingly, even when there is inclination with the ridge 12a as the center axis, the roof prism 12 reflects the incident laser beam as a laser beam which is parallel to and travels in the opposite direction of the incident laser beam.

Furthermore, the roof prism 12 reflects the incident laser beam as above, as a laser beam which is parallel to and travels in the opposite direction of the incident laser beam, in the case where the incident laser beam is inclined with respect to the optical axis 14 as well. Moreover, for the sake of explanation, the optical path 15 and optical path 16 are shown shifted from the optical axis 14 in the FIGS. 29 and 30. However, in actuality, the center of the beam corresponds to the optical axis 14 in both the optical path 15 and the optical path 16, and the laser beam is emitted and reflected in a range that includes the ridge 12a.

Still further, as shown in FIG. 28, a self-compensating laser resonator is constructed by disposing the ridge 11a of the roof prism 11 and the ridge 12a of the roof prism 12 in orthogonal directions to each other so that the inclination of the roof prism 11 and the roof prism 12 compensate each other.

As configurations of the laser resonator, a traveling wave resonator and standing wave resonator will be considered here. With a traveling wave resonator, a laser beam emanating from a laser medium returns to the laser medium without taking the same optical path, during one circuit inside the resonator, so as to be confined inside the laser resonator as a traveling wave. At this time, during one circuit in the resonator, the laser beam passes through the laser medium one time and is amplified. On the other hand, with a standing wave resonator, a laser beam emanating from a laser medium returns to the laser medium by traveling back along the same optical path so as to be confined inside the laser resonator as a standing wave. At this time, during one circuit in the resonator, the laser beam passes through the laser medium twice and is amplified. That is to say, when a laser beam circuits the resonators once, with the traveling wave resonator it is only amplified one time, whereas, with the standing wave resonator it is amplified twice. The laser resonator shown in FIGS. 26, 28 is a standing wave resonator.

In a conventional self-compensating laser resonator configured as described above, since the laser beam is emitted in a range that includes the ridges 11a and 12a of the roof prisms 11 and 12, loss occurs due to diffraction and the efficiency of the laser beam is degraded. Also, since, on a microscopic level, the kind of reflection shown in FIG. 29 does not occur at the ridges 11a and 12a and the laser beam is split by the ridges 11a and 12a, the laser beam is easily split into two (2) or four (4) and the quality thereof is degraded. Furthermore, when attempting to realize a long optical path with a small laser resonator, an optical element for bending back the laser, such as the corner cube prism 13, is needed in addition to the roof prisms 11 and 12, and thus, the structure of the laser resonator becomes complicated. Moreover, the roof prisms 11 and 12 apply different phase shifts to the laser beam field component parallel to the ridges 11a and 12a (S polarization) and the laser beam field component orthogonal thereto (P polarization). Therefore, except for the instances where the linearly polarized laser beam is reflected parallel or orthogonal to the ridges 11a and 12a, the polarization of the laser beam reflected by the roof prisms 11,12 is not maintained such that the phase state of the laser beam having made a circuit in the resonator is not harmonized and loss occurs. Consequently, the utilization efficiency and quality of the laser beam are degraded.

3. Problems the Present Invention Aims to Solve

In the conventional self-compensating laser resonator, there is loss due to diffusion and the utilization efficiency of the laser beam is degraded because the laser beam is emitted in a range that includes the ridges 11a and 12a of the prisms 11 and 12, respectively. Also, since, on a microscopic level, the kind of reflection shown in FIG. 29 does not occur at the ridges 11a and 12a and the laser beam is split by the ridges 11a and 12a, the laser beam is easily split into two (2) or four (4) and the quality thereof is degraded.

Furthermore, when attempting to realize a long optical path with a small laser resonator, an optical element for bending back the laser, such as the corner cube prism 13, is needed in addition to the roof prisms 11 and 12, and thus, the structure of the laser resonator becomes complicated.

Moreover, the roof prisms 11 and 12 apply different phase shifts to the laser beam field component parallel to the ridges 11a and 12a (S polarization) and the laser beam field component orthogonal thereto (P polarization). Therefore, except for the instances where the linearly polarized laser beam is reflected parallel or orthogonal to the ridges 11a and 12a, the polarization of the laser beam reflected by the roof prisms 11,12 is not maintained such that the phase state of the laser beam having made a circuit in the resonator is not harmonized and loss occurs. Consequently, the efficiency and quality of the laser beam are degraded.

SUMMARY OF THE INVENTION

The present invention aims to solve the above mentioned problems and an object of the present invention is to provide a standing wave type self-compensating laser resonator with a simple structure, which can prevent lowering of the laser efficiency while at the same time improving the quality of the laser beam.

According to one aspect of the present invention there is provided a self-compensating laser resonator including: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a laser medium provided between the first reflecting surface and the third reflecting surface; and a light source for exciting the laser medium, wherein, a second ridge formed by two planes including the third and fourth reflecting surfaces is on a plane substantially orthogonal to a first ridge formed by two planes including the first and second reflecting surfaces, characterized in that, a laser beam emanating from the laser medium and traveling toward the first reflecting surface is successively reflected by the first, second, third, fourth, second, first, fourth and third reflecting surfaces to again enter the laser medium.

According to another aspect of the present invention, an isolator which allows a laser beam to pass there-through in only one direction is provided in an optical path of the a laser beam.

According to yet another aspect of the present invention, a partially reflective mirror used for laser output is provided at any one of first to fourth reflecting surfaces.

According to still another aspect of the present invention, polarizing reflecting means for selectively allowing to pass there-through to be output to an outside portion any one of a P polarization component and an S polarization component of a laser beam while reflecting the other component is provided at any one of the first to fourth reflecting surfaces, and polarization component adjusting means for dividing the laser beam relative to polarizing reflecting means into the P polarization component and the S polarization component at an arbitrary ratio is provided in an optical path of the laser beam.

According to still yet another aspect of the present invention, polarizing reflecting means for selectively allowing to pass there-through any one of a P polarization component and an S polarization component of a laser beam while reflecting the other component to be output to an outside portion is provided, and polarization component adjusting means for dividing the laser beam relative to polarizing reflecting means into the P polarization component and the S polarization component at an arbitrary ratio is provided in an optical path of the laser beam.

According to yet another aspect of the present invention, an isolator for passing a laser beam there-through in only one direction, including, two polarization component adjusting means for selectively allowing to pass there-through any one of a P polarization component and an S polarization component of a laser beam while reflecting the other component to be output to an outside portion, a Faraday rotator and a half wave plate, and, polarization component adjusting means for dividing the laser beam relative to polarizing reflecting means into the P polarization component and the S polarization component at an arbitrary ratio is provided.

According to still yet another aspect of the present invention, polarization component adjusting means is a half wave plate.

According to still yet another aspect of the present invention, polarization component adjusting means is a birefringent optical element capable of achieving a birefringence effect in accordance with an applied voltage.

According to still yet another aspect of the present invention, a Seeder light generating apparatus for making Seeder light incident in an optical path of a laser beam reflected from polarization reflecting means is provided.

According to still yet another aspect of the present invention a beam diameter converting device for converting a beam diameter of a laser beam is provided.

According to still yet another aspect of the present invention there is provided a self compensating laser resonator comprising: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a third reflecting apparatus provided between the second reflecting surface and the fourth reflecting surface, having a fifth reflecting surface and a sixth reflecting surface disposed parallel to, and facing away from, each other; a laser medium provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, fifth, fourth, third, second and first reflecting surfaces to again enter the laser medium, passes through the laser medium, and is further successively reflected by the third, fourth, first, second, sixth, second, first, fourth and third reflecting surfaces to once again enter the laser medium.

According to still yet another aspect of the present invention, the third reflecting apparatus comprises two single-sided reflecting mirrors mutually fixed by a holder and disposed such that the reflecting surfaces thereof are parallel and face in opposite directions from each other.

According to still yet another aspect of the present invention, the third reflecting apparatus comprises a reflecting mirror having a two-sided reflecting surface on one surface thereof for reflecting a laser beam with a front surface and a rear surface.

According to still yet another aspect of the present invention, there is provided a self-compensating laser resonator comprising: a first reflecting apparatus having the first reflecting surface and a second reflecting surface disposed at a right angle to each other; a second reflecting apparatus facing the first reflecting apparatus and having a third reflecting surface and a fourth reflecting surface disposed at a right angle to each other; a laser medium having a seventh two-sided reflecting surface on an optical axis of a laser beam on one end surface thereof provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, second, first, fourth, third and seventh two-sided reflecting surfaces, and is further successively reflected by the third, fourth, first, second, fourth, third, second and first reflecting surfaces to again enter the laser medium, passes through the laser medium and is reflected by the seventh two-sided reflecting surface.

According to still yet another aspect of the present invention, a self-compensating laser resonator is comprising: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a laser medium provided between the first reflecting surface and the third reflecting surface; a light source for exciting the laser medium; and an optical component having an eighth two-sided reflecting surface on an optical axis of the laser beam on one end surface thereof provided between the second reflecting surface and the fourth reflecting surface, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, eighth two-sided, fourth, third, second and first reflecting surfaces to again enter the laser medium, passes through the laser medium, is further successively reflected by the third, fourth, first and second reflecting surfaces to be incident on the optical component, and is further successively reflected by the eighth two-sided, second, first, fourth and third reflecting surfaces to once again enter the laser medium.

According to still yet another aspect of the present invention, the first reflecting apparatus and second reflecting apparatus each have two flat reflecting mirrors disposed at a right angle to each other.

According to still yet another aspect of the present invention, the two flat reflecting mirrors disposed at a right angle to each other are disposed with a gap therebetween and are joined to one another by means of a joining member.

According to still yet another aspect of the present invention, the first reflecting apparatus and second reflecting apparatus each comprise a prism having two reflecting surfaces disposed at right angles to each other and an incident surface of the laser beam.

According to still yet another aspect of the present invention, a self-compensating laser resonator is comprising: a first prism having first and second reflecting surfaces disposed at right angles to each other and a first incident surface of the laser beam; a second prism facing said first prism and having third and fourth reflecting surfaces disposed at right angles to each other and a second incident surface of the laser beam, and provided with a ninth two-sided reflecting surface on an optical path of the laser beam incident on the second incident surface; a laser medium provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, second, first, ninth two-sided, first, second, fourth, third, second and first reflecting surfaces to again enter the laser medium, passes through the laser medium, and is further successively reflected by the third, fourth, ninth two-sided, fourth and third reflecting surfaces to once again enter the laser medium.

According to still yet another aspect of the present invention, the first and second ridges of the first and second prisms are eliminated.

DETAILED DESCRIPTION OF THE PREFERRED EMBODIMENTS

Next, preferred embodiments of the present invention will be explained with reference to the drawings.

Embodiment 1

Figure 1:
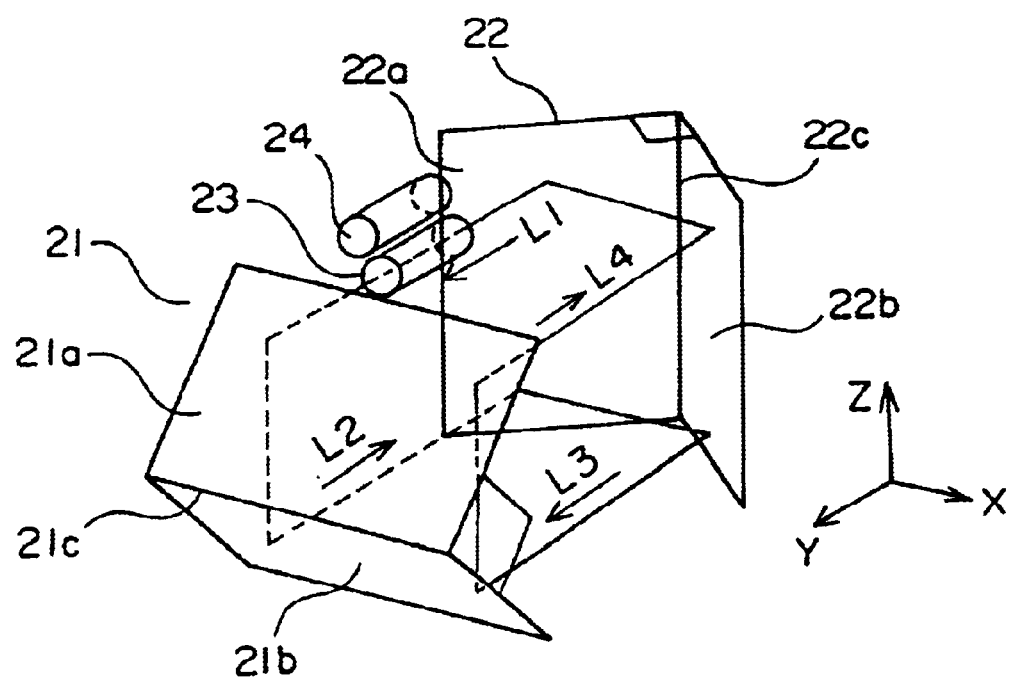
FIG. 1 is a schematic perspective view showing a self-compensating laser resonator according to Embodiment 1 of the present invention.
Figure 2:
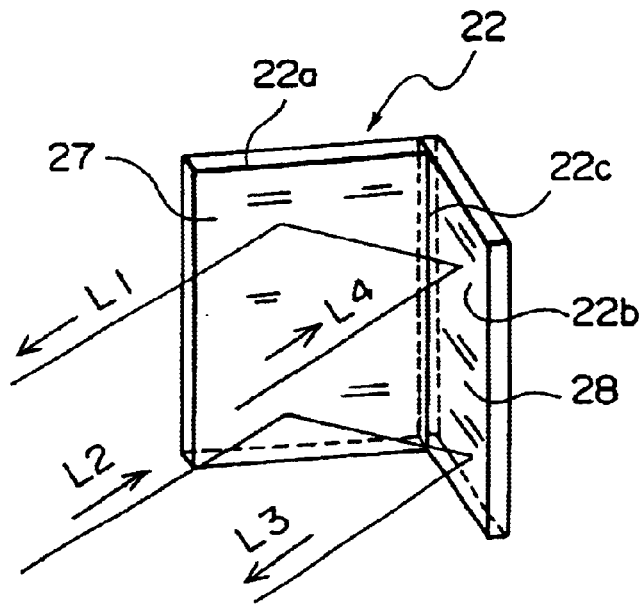
FIG. 2 is a perspective view showing an example of the reflecting apparatus in FIG. 1.

FIG. 1 is a schematic perspective view showing a self-compensating laser resonator according to Embodiment 1 of the present invention. In FIG. 1, a first reflecting apparatus 21 includes first and second reflecting surfaces 21a, 21b disposed at a right angle to each other, a second reflecting apparatus 22 facing the first reflecting apparatus 21 includes third and fourth reflecting surfaces 22a, 22b disposed at a right angle to each other. As shown in FIG. 2 for example, the first and second reflecting apparatuses 21, 22 include two flat reflecting mirrors 27, 28 disposed at a right angle to each other. Furthermore, although only the second reflecting apparatus 22 is shown in FIG. 2, the first reflecting apparatus 21 has the same structure.

Moreover, a second ridge 22c formed by the third and fourth reflecting surfaces 22a, 22b is positioned on a plane substantially orthogonal to a first ridge 21c formed by the first and second reflecting surfaces 21a, 21b such that the first and second reflecting surfaces 21a, 21b and third and fourth reflecting surfaces 22a, 22b face each other. A laser medium 23 is provided between the first reflecting surface 21a and third reflecting surface 22a. A light source 24 excites the laser medium 23.

Next, the operation will be explained. After passing through the laser medium 23 and being amplified, a laser beam traveling along an optical path L1 is successively reflected by the first reflecting surface 21a and second reflecting surface 21b to travel in the opposite direction along an optical path L2 which is parallel to the optical path L1. The laser beam traveling along the optical path L2 is successively reflected by the third reflecting surface 22a and fourth reflecting surface 22b to travel in the direction opposite the optical path L2 along an optical path L3 which is parallel to the optical path L2. The laser beam traveling along the optical path L3 is then successively reflected by the second reflecting surface 21b and first reflecting surface 21a to travel in the direction opposite the optical path L3 along an optical path L4 which is parallel to the optical path L3.

The laser beam traveling along the optical path L4 is then successively reflected by the fourth reflecting surface 22b and third reflecting surface 22a to return to the optical path L1 and is further amplified by the laser medium 23. Accordingly, the laser beam is not incident on the ridges 21c, 22c of the first and second reflecting apparatuses 21,22, and is confined and gradually amplified in the laser resonator.

In a self-compensating laser resonator constructed as above, since the laser beam is not incident on the ridges 21c, 22c of the reflecting apparatuses 21, 22 there is no loss due to diffraction at the ridges 21c, 22c, and thus, it is possible to prevent the utilization efficiency of the laser beam from being lowered. Also, since the laser beam is not split by the ridges 21c, 22c, the quality of the laser is improved. Moreover, since the four (4) optical paths L1 to L4 can be arranged in parallel and because no other reflecting means is necessary besides the first and second reflecting apparatuses 21, 22, the laser resonator can be realized in a small size. Still further, because the flat reflecting mirrors 27, 28 are light-weight, the weight of the reflecting apparatuses 21, 22, as well as that of the entire laser resonator can be further reduced.

Moreover, although in the above embodiment the laser medium 23 is disposed in the optical path L1, the laser medium 23 may be disposed in any of the optical paths L1 to L4. Also, a plurality of laser mediums 23 and exciting light sources 24 may be disposed in a plurality of optical paths.

Embodiment 2

Figure 3:
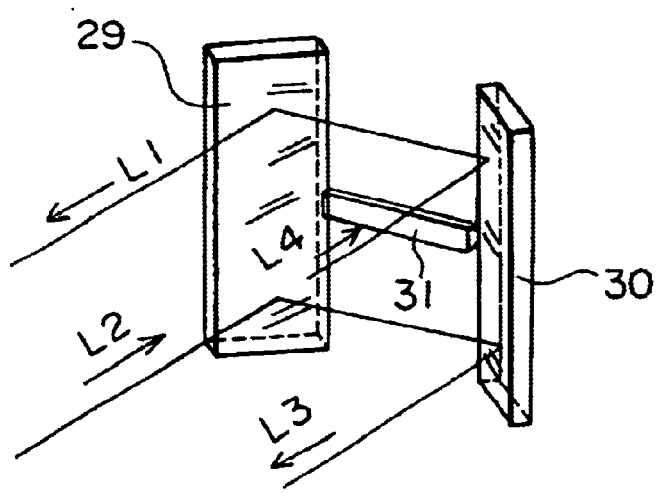
FIG. 3 is a perspective view showing a third reflecting apparatus of a self-compensating laser resonator according to Embodiment 2 of the present invention.

Moreover, the ridge portions 21c, 22c of the flat reflecting mirrors 27, 28 may be eliminated so that the laser beam will not be incident thereon. Namely, as shown in FIG. 3, flat reflecting mirrors 29, 30 having a surface area smaller than those shown in FIG. 2 are disposed with a gap therebetween, and may be joined by means of a joining member 31. With a construction such as this, the size and weight of the laser resonator can be further reduced.

Embodiment 3

Figure 4:
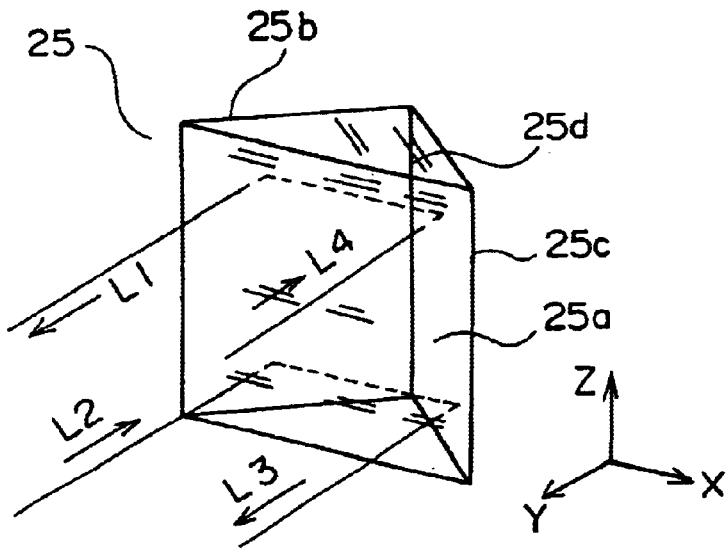
FIG. 4 is a perspective view showing a third reflecting apparatus of a self-compensating laser resonator according to Embodiment 3 of the present invention.

FIG. 4 is a perspective view showing a self-compensating laser resonator according to Embodiment 3 of the present invention. In the present embodiment, a roof prism 25 is used as the reflecting apparatuses 21, 22 of FIG. 1. The roof prism 25 has an incident surface 25a on which a laser beam is incident, two reflecting surfaces 25b, 25c disposed orthogonally to each other, and a ridge 25d. Also, 45 degree angles are formed between the incident surface 25a and each of the reflecting surfaces 25b, 25c. Furthermore, surfaces besides the incident surface 25a and the reflecting surfaces 25b, 25c (the upper and lower surfaces in the FIG.) may have an arbitrary shape and angle so long as this does not interfere with the portions through which the laser beam passes. The rest of the construction is the same as in Embodiments 1.

Next, the operation will be explained. A laser beam passes through the incident surface 25a and is completely reflected by the reflecting surface 25b. The laser beam completely reflected by the reflecting surface 25b is completely reflected by the reflecting surface 25c parallel to, and in the opposite direction of, the incident laser beam to be output from the incident surface 25a.

Next, a shift in the polarization of the laser beam in the above resonator using the roof prism 25 as the reflecting apparatuses 21, 22 will be considered. First, when the laser beam is reflected by a flat surface, a P polarization component vibrates within a plane that includes the incident beam and the reflected beam and an S polarization component vibrates orthogonal to a plane that includes the incident and reflected beam. When a laser is reflected by the reflecting surfaces 25b, 25c of the first roof prism 25, a phase shift is imparted. Since the amount of this phase shift differs depending on the P polarization component and S polarization component, the polarization of the laser beam in the optical path L4 is shifted in the optical path L2, except in the cases where, for example, the polarization in the optical path L1 with respect to the reflecting surface 25c is only the P polarization component or only the S polarization component.

Here, an X-axis component and Z-axis component of an arbitrary polarization in the optical path L1 are defined as Ex and Ez, respectively, and the polarization of a laser beam transmitted from the optical path L1 to the optical path L3 will be considered. During transmission of the X-axis component Ex of the laser beam from the optical path L1 to the optical path L3, the X-axis component Ex is reflected twice by the first reflecting apparatus 21 with an S polarization and twice by the second reflecting apparatus 22 with a P polarization. Moreover, in transmission of the Z-axis component Ez of the laser beam from the optical path L1 to the optical path L3a, the Z-axis component Ez is reflected twice by the first reflecting apparatus 21 with a P polarization and twice by the second reflecting apparatus 22 with an S polarization.

Since the X-axis component Ex and the Z-axis component Ez each receive two phase shifts due to P polarization reflection and two phase shifts due to S polarization reflection in an equal amount, the polarization state in optical path L1 is maintained in optical path L3. Accordingly, for a laser beam of an arbitrary polarization state, the same polarization is maintained between the optical paths L1, L3, and between the optical path L2 and the optical path L4. The change in polarization due to reflection by the prism can be canceled-out by disposing an optical component in the optical paths L1, L3 which are diagonally positioned relative to each other, or the optical paths L2 and L4 which are also diagonally positioned relative to each other, and thus, design of the laser resonator is facilitated.

Accordingly, in case where the roof prism 25 is used as the reflecting apparatuses 21, 22, it is also possible to construct a self-compensating laser resonator wherein the laser beam is not incident on the ridge 25c. Hence, with a simple construction, it is possible to prevent the utilization efficiency of the laser beam from being lowered while at the same time improving the quality of the laser beam. Moreover, because it is difficult for a variation to develop in the angle between the reflecting surfaces 25b, 25c, a stable self-compensating laser resonator may be obtained. Also, since there is no phase shift in diagonal optical paths due to reflection at the reflecting surfaces 25b, 25c the design of the laser resonator is facilitated.

Embodiment 4

Figure 5:
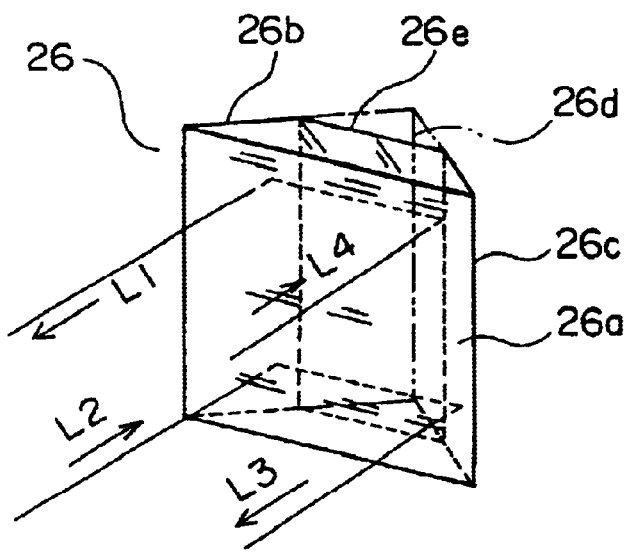
FIG. 5 is a schematic perspective view showing a self-compensating laser resonator according to Embodiment 4 of the present invention.

Although the prism 25 having the ridge 25d is described in the above embodiment, as shown in FIG. 5 for example, a roof prism 26 having an incident surface 26a and reflecting surfaces 26b, 26c disposed at a right angle to each other and in which a portion in the vicinity of a ridge 26d formed by two planes including the reflecting surfaces 26b, 26c is eliminated, may be used. That is, the portion in the vicinity of a ridge 26d may be removed, giving the prism a trapezoidal cross-section, so that the laser beam will not pass there-through. Moreover, a cut surface 26e may have an arbitrary shape and angle so long as this does not interfere with the portions through which the laser beam passes. Accordingly, by using a roof prism wherein the portion in the vicinity of the ridge 26d is cut-away, the weight and size of the entire laser resonator can be reduced.

Embodiment 5

Figure 6:
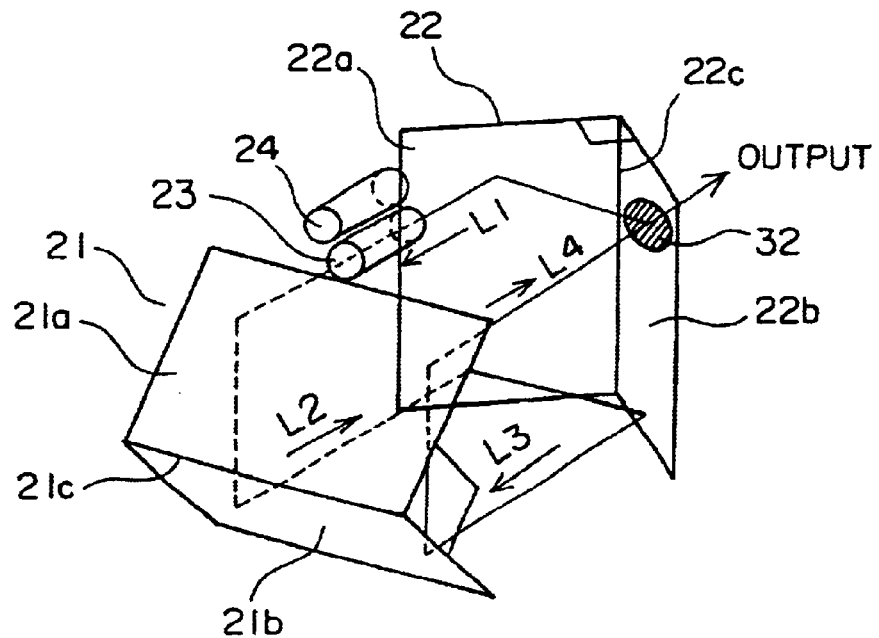
FIG. 6 is a schematic perspective view showing a self-compensating laser resonator according to Embodiment 5 of the present invention.

FIG. 6 is a schematic perspective view showing a self-compensating laser resonator according to Embodiment 5 of the present invention. In the present embodiment, a partially reflective mirror 32 used for laser output is provided at a portion of the fourth reflecting surface 22b of the second reflecting apparatus 22, that is, at a portion which intersects with the optical path L4. The rest of the construction is similar to that in Embodiment 1.

In a self-compensating laser resonator such as above, as in Embodiment 1, a laser beam successively travels along optical paths L1 to L4 and is amplified. Moreover, a portion of the laser beam pass through the partially reflective mirror 32 and is output to an outside portion (the outside), and a remaining portion of the laser beam is reflected thereat to circuit inside the laser resonator. Thus, by providing the partially reflective mirror 32 at a portion of the fourth reflecting surface 22b, laser output can be achieved with a simple structure. Also, loss in the laser beam may be suppressed because there are few optical components.

Moreover, although in the above embodiment the partially reflective mirror 32 is provided at a portion where the optical path L4 intersects the fourth reflecting surface 22b, it may be provided at any one of first to fourth reflecting surfaces 21a, 21b, 22a and 22b.

Embodiment 6

Figure 7:
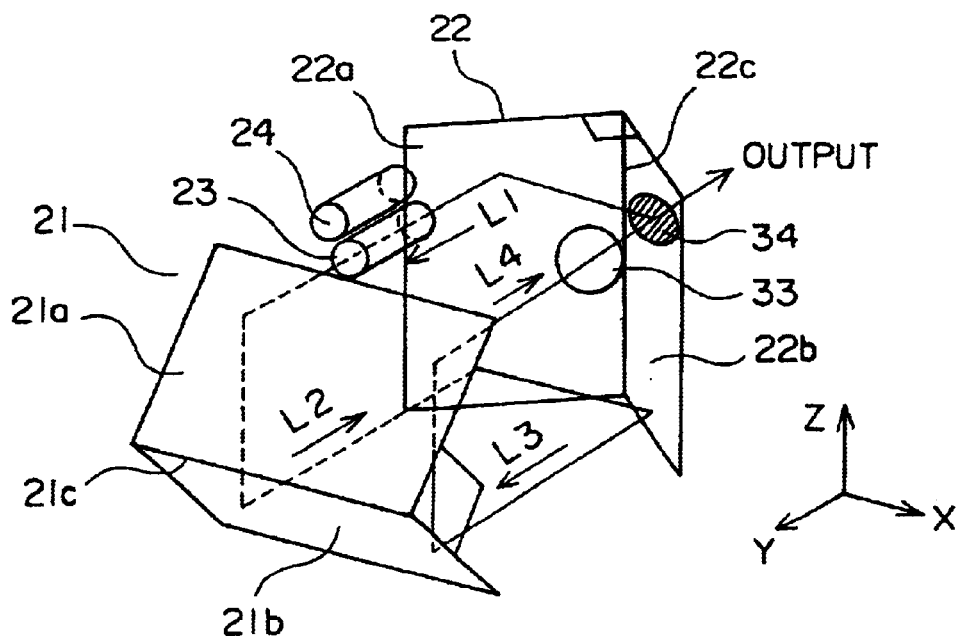
FIG. 7 is a perspective view showing a self-compensating laser resonator according to Embodiment 6 of the present invention.

FIG. 7 is a perspective view showing a self-compensating laser resonator according to Embodiment 6 of the present invention. In the figure, a half wave plate 33 as polarization components adjusting means is provided in the optical path L4; a polarizing reflecting mirror 34 as polarizing reflecting means is provided at a portion where the optical path L4 intersects the fourth reflecting surface 22b. The polarizing reflecting mirror 34 allows a P polarization of a laser beam to pass there-through and reflects an S polarization thereof. Nevertheless, a components which vibrates within a plane that includes the incident beam and the reflected beam is the P polarization and a component which vibrates orthogonal to a plane that includes the incident and reflected beam is the S polarization.

In a self-compensating laser resonator such as above, since only the S polarization of a laser beam, relative to the polarizing reflecting mirror 34, is reflected by the polarizing reflecting mirror 34, only the S polarization of the laser beam circuits inside the laser resonator.

Figure 8:
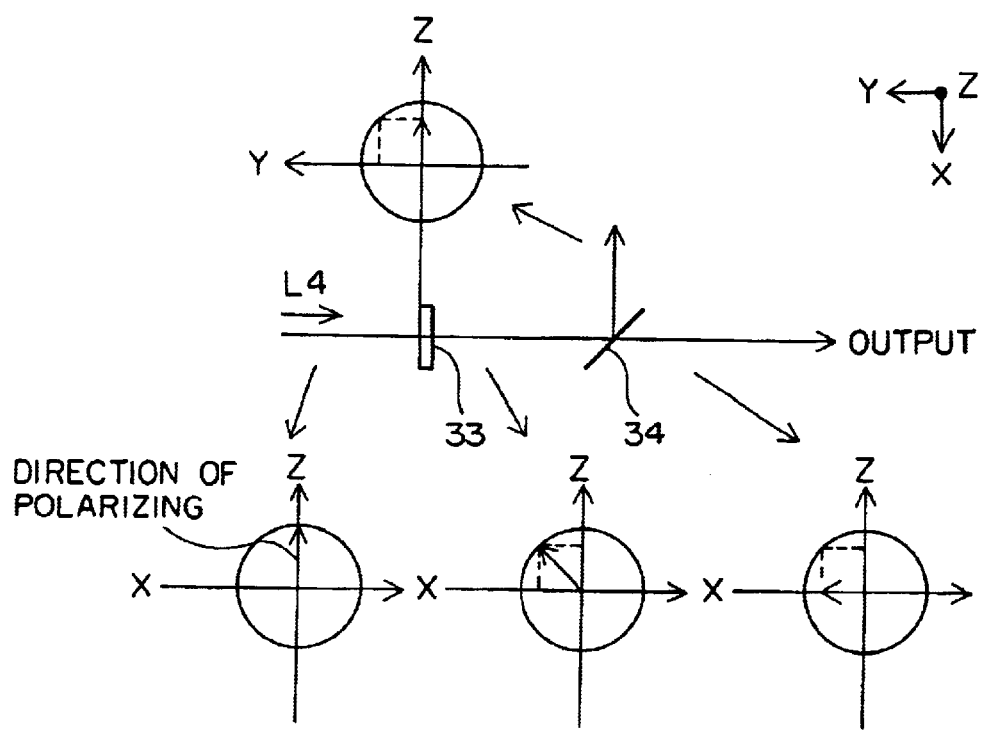
FIG. 8 is an explanatory view showing changes in polarization components of a laser beam in the self-compensating laser resonator of FIG. 7.

Here, FIG. 8 is an explanatory view showing changes in polarization components of a laser beam in the self-compensating laser resonator of FIG. 7, showing the front and rear of half wave plate 33 and polarizing reflecting mirror 34. The half wave plate 33 functions to rotate a polarization direction an arbitrary angle and is capable of dividing the laser beam relative to the polarizing reflecting mirror 34 into a P polarization component and an S polarization component at an arbitrary ratio. Accordingly, when the laser beam, having passed through the half wave plate 33, is incident on the polarizing reflecting mirror 34, the S polarization component is reflected and the P polarization component is output outside of the laser resonator.

In a self-compensating laser resonator such as above, laser output can be achieved with a simple structure. Also, loss in the laser beam may be suppressed because there are few optical components. Furthermore, since the laser beam is divided at an arbitrary ratio into the P polarization component and S polarization component by the half wave plate 33, the ratio of the laser beam to be output from the laser resonator may be optionally selected.

Furthermore, Moreover, although in the above embodiment the polarizing reflecting mirror 34 is provided at a portion where the optical path L4 intersects the fourth reflecting surface 22b, it may be provided at any one of first to fourth reflecting surfaces 21a, 21b, 22a and 22b.

Also, although in the above embodiment the polarizing reflecting mirror 34 passes the P polarization of the laser there-through while reflecting the S polarization thereof, the S polarization may pass there-through while the P polarization is reflected.

Furthermore, although the half wave plate 33 is disposed in the optical path L4, it may be disposed in any one of optical paths L1 to L4.

Embodiment 7

Figure 9:
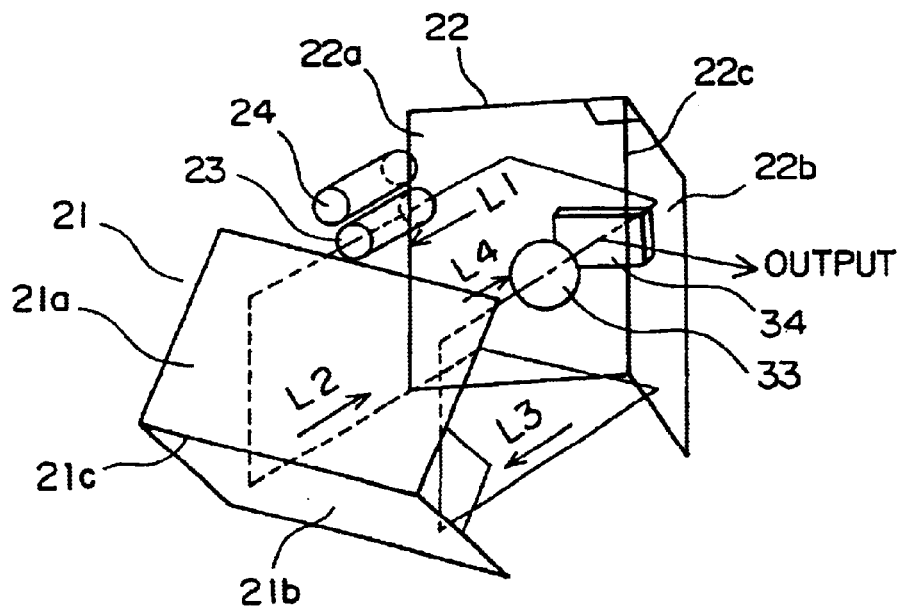
FIG. 9 is a schematic perspective view showing a self-compensating laser resonator according to Embodiment 7 of the present invention.

Still further, although in the above embodiment the polarizing reflecting mirror 34 is disposed at the reflecting surface 22b such that the laser beam passing there-through is output to the outside, for example, as shown in FIG. 9, the polarizing reflecting mirror 34 may be disposed in the optical path L4 between the half wave plate 33 and the fourth reflecting surface 22b such that such the laser beam passing through the polarizing reflecting mirror 34 circuits inside the laser resonator and the laser beam reflected by the polarizing reflecting mirror 34 is output to the outside.

Embodiment 8

Figure 10:
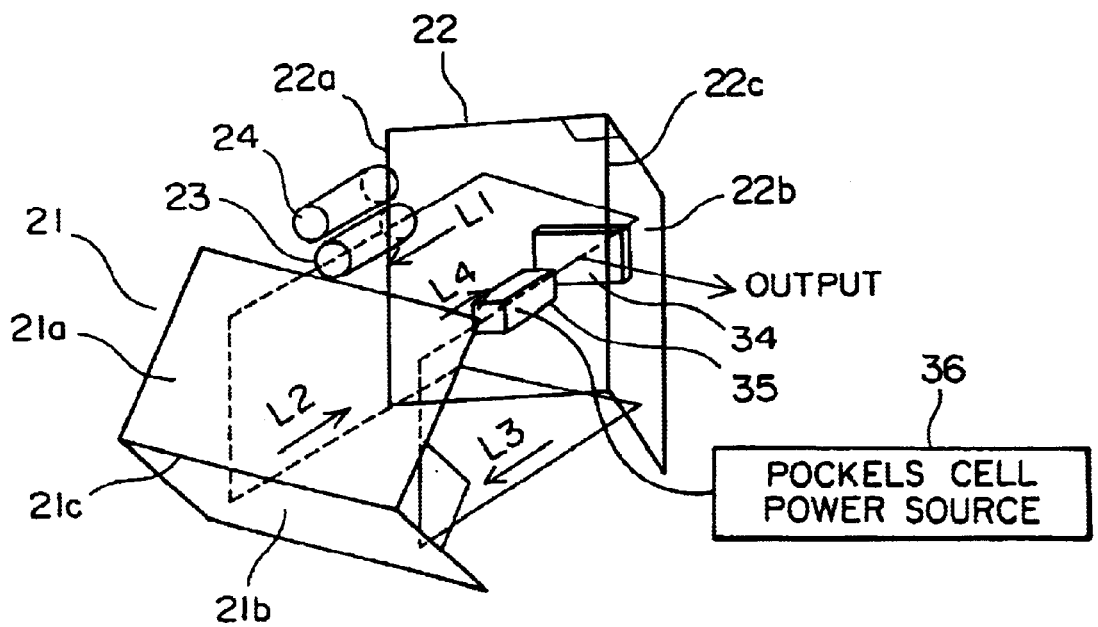
FIG. 10 is a schematic perspective view showing a self-compensating laser resonator according to Embodiment 8 of the present invention.

Next, FIG. 10 is a schematic perspective view showing a self-compensating laser resonator according to Embodiment 8 of the present invention. In the figure, birefringent optical element 35 as polarization component adjusting means for obtaining a birefringence effect in accordance with an applied voltage is provided in an optical path L4 and, for example, a Pockels cell made from lithiumniobate ($LiNbO_3$) may be used as the birefringent optical element 35. A Pockels cell power source 36 is connected to the birefringent optical element 35.

In a self-compensating laser resonator such as above, a P polarization, which is a linear polarization, of the laser beam passes through the polarizing reflecting mirror 34 and only the P polarization with respect to the polarizing reflecting mirror 34 circuits inside the laser resonator. Also, the laser beam circuiting inside the laser resonator is incident on the birefringent optical element 35. By applying a voltage from the Pockels cell power source 36 to the birefringent optical element 35, wave board characteristics may be generated, linearly polarized light may be changed to circularly polarized light and the polarization direction may be rotated. That is, the laser beam relative to the polarizing reflecting mirror 34 is divided at an arbitrary ratio into the P polarization component and S polarization component in accordance with the applied voltage.

Thus, the laser beam divided into the P polarization component and S polarization component by the birefringent optical element 35 is incident on the polarizing reflecting mirror 34 and the P polarization component passes there-through to circuit inside the laser resonator and the S polarization component is output outside the laser resonator as a laser beam. Accordingly, laser beam may be divided at an arbitrary ration into the P polarization component and S polarization component by the applied voltage of birefringent optical element 35 and the ratio of the laser beam output to outside the laser resonator may be optionally changed.

Moreover, although in the above embodiment the polarizing reflecting mirror 34 passes the P polarization of the laser there-through while reflecting the S polarization thereof, the S polarization may pass there-through while the P polarization is reflected.

Furthermore, although the birefringent optical element 35 is disposed in the optical path L4, it may be disposed in any one of optical paths L1 to L4.

Embodiment 9

Figure 11:
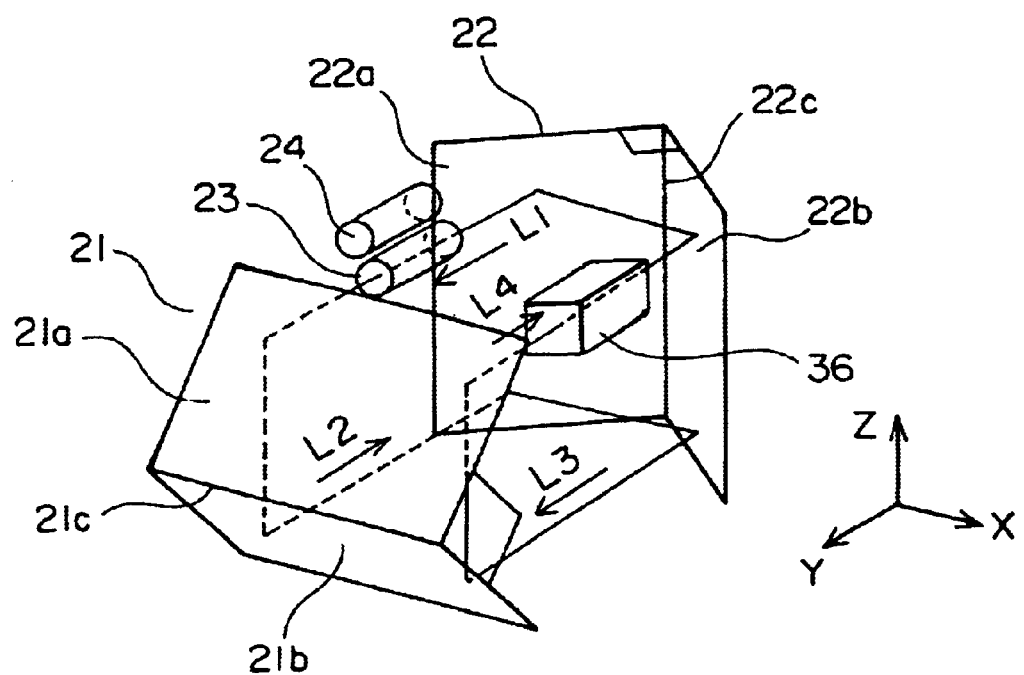
FIG. 11 is a schematic perspective view showing a self-compensating laser resonator according to Embodiment 9 of the present invention.
Figure 12:
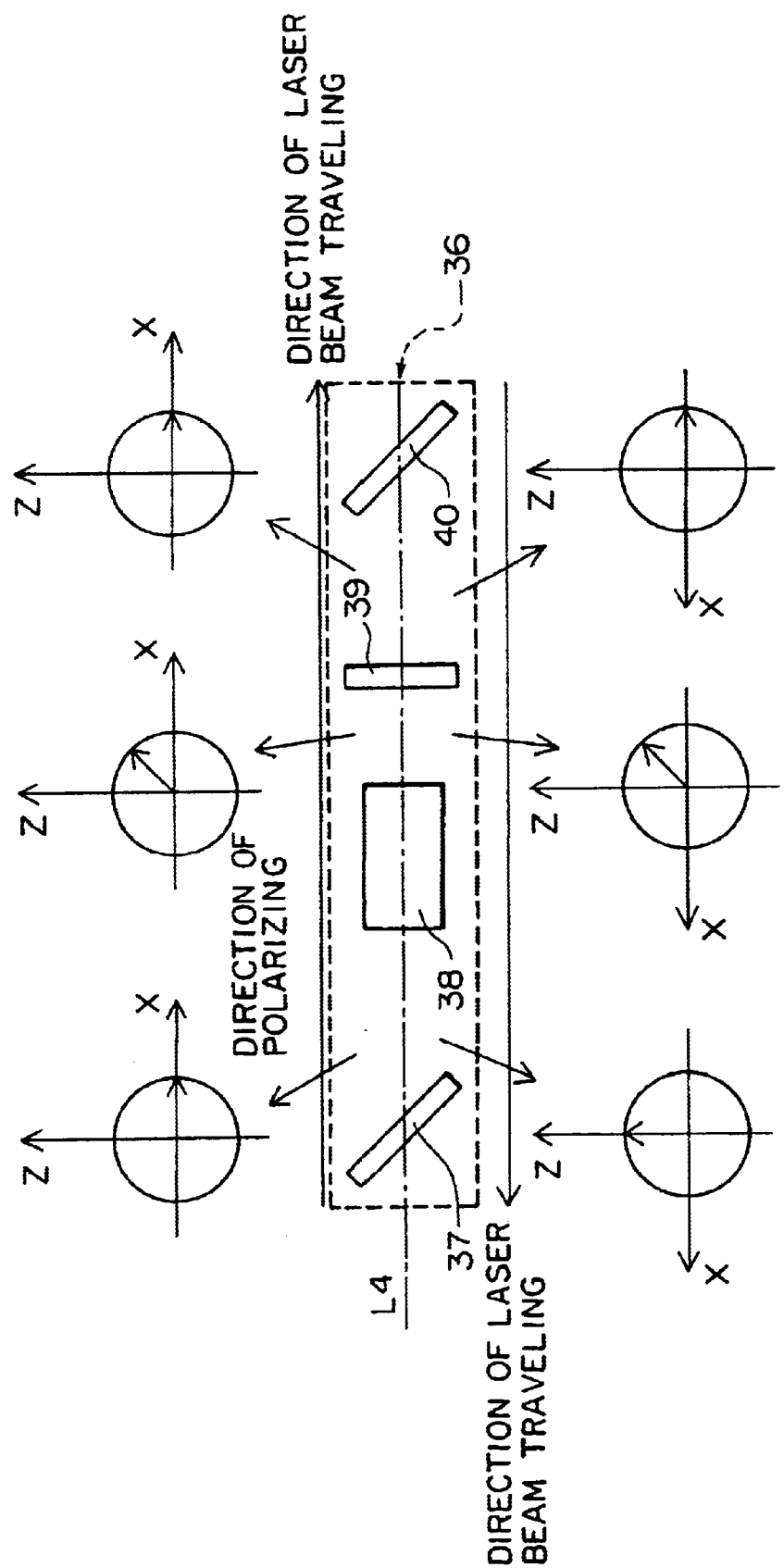
FIG. 12 is an explanatory drawing for explaining the principle of the isolator in FIG. 11.

Next, FIG. 11 is a schematic perspective view showing a self-compensating laser resonator according to Embodiment 9 of the present invention. In the figure, an isolator 36 is disposed in an optical path L4. Moreover, FIG. 12 is an explanatory drawing for explaining the principle of the isolator in FIG. 11. The isolator 36 includes a first polarizing reflecting mirror 37, a Faraday rotator 38, a half wave plate 39 and a second polarizing reflecting mirror 40. Furthermore, the polarizing reflecting mirrors 37, 40 as polarizing reflecting means both reflect the S polarization of the laser and allow the P polarization to pass there-through.

In a self-compensating laser resonator such as above, a laser beam incident on the isolator 36 is first linearly polarized in an x-axis direction by passing through the first polarizing reflecting mirror 37. Then, the polarization direction of the laser beam is rotated 45 degrees from the x-axis in a direction of a z-axis by the Faraday rotator 38. The laser beam having passed through the Faraday rotator 38 is rotated 45 degrees from the z-axis in a direction of the x-axis by the half wave plate 39. Furthermore, The laser beam having passed through the half wave plate 39 passes through the second polarizing reflecting mirror 40.

Here, a case where a laser beam is incident on the isolator 36 from the second polarizing reflecting mirror 40-side will be considered. The laser beam having passed through the second polarizing reflecting mirror 40 is rotated 45 degrees from the x-axis in a direction of a z-axis by the half wave plate 39. Then the laser beam is rotated 45 degrees from the x-axis in a direction of a z-axis by the Faraday rotator 38. Accordingly, the laser beam having passed through the Faraday rotator 38 is polarized in the direction of the z-axis. The laser polarized in the z-axis direction cannot pass through the first polarizing reflecting mirror 37 and the entire laser is output to the outside thereby. Accordingly, the isolator 36 function to allow the laser beam to pass there-through in only one direction.

In a laser resonator wherein such an isolator 36 is provided, the laser beam circuiting inside the laser resonator can be regulated to one direction and the laser beam can be stabilized.

Moreover, although in the above embodiment the polarizing reflecting mirrors 37, 40 pass the P polarization of the laser there-through while reflecting the S polarization thereof, they may be such that the S polarization passes there-through while the P polarization is reflected.

Furthermore, although the isolator 36 is disposed in the optical path L4, it may be disposed in any one of optical paths L1 to L4.

Embodiment 10

Figure 13:
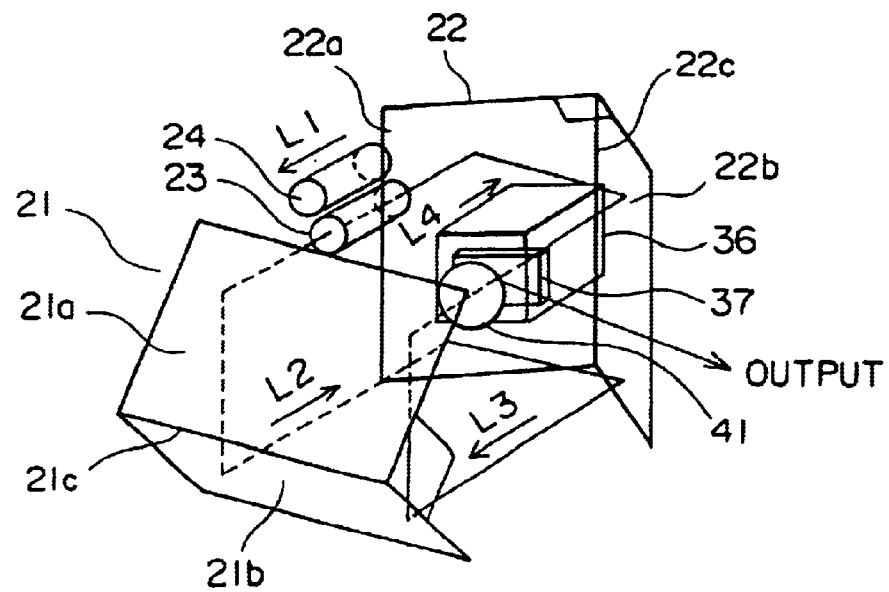
FIG. 13 is a schematic perspective view showing a self-compensating laser resonator according to Embodiment 10 of the present invention.

Next, FIG. 13 is a schematic perspective view showing a self-compensating laser resonator according to Embodiment 10 of the present invention. In the present embodiment, a half wave plate 41 is disposed upstream of an isolator 36 which is similar to that in Embodiment 9.

In a self-compensating laser resonator such as above, a laser beam is divided at an arbitrary ration into the P polarization component and S polarization component, relative to the first polarization reflecting mirror 37 of the isolator 36, by the half wave plate 41. Here, the P polarization component passes through (the first polarization reflecting mirror 37) to circuit inside the laser resonator and the S polarization component is output to the outside of the laser resonator. Accordingly, the direction in which the laser beam circuits may be regulated to one direction and the ratio of the laser beam output to outside the laser resonator may be optionally changed. Also, since the first polarization reflecting mirror 37 of the isolator 36 can also be used for laser output, the number of optical components may be reduced, and loss in the laser beam can be reduced while at the same time reducing the size of the entire laser resonator.

Moreover, although in the above embodiment the polarizing reflecting mirror 37 passes the P polarization of the laser there-through while reflecting the S polarization thereof, it may be such that the S polarization passes there-through while the P polarization is reflected.

Also, although the isolator 36 and the half wave plate 41 are disposed in the optical path L4, it may be disposed in any one of optical paths L1 to L4.

Furthermore, a birefringent optical element 35 such as that in Embodiment 8 (FIG. 10) may be used instead of the half wave plate 41. In this case, the direction in which the laser beam circuits may be regulated to one direction, and the ratio of the laser beam output to outside the laser resonator may be optionally changed by a voltage applied to the Pockels cell.

Embodiment 11

Figure 14:
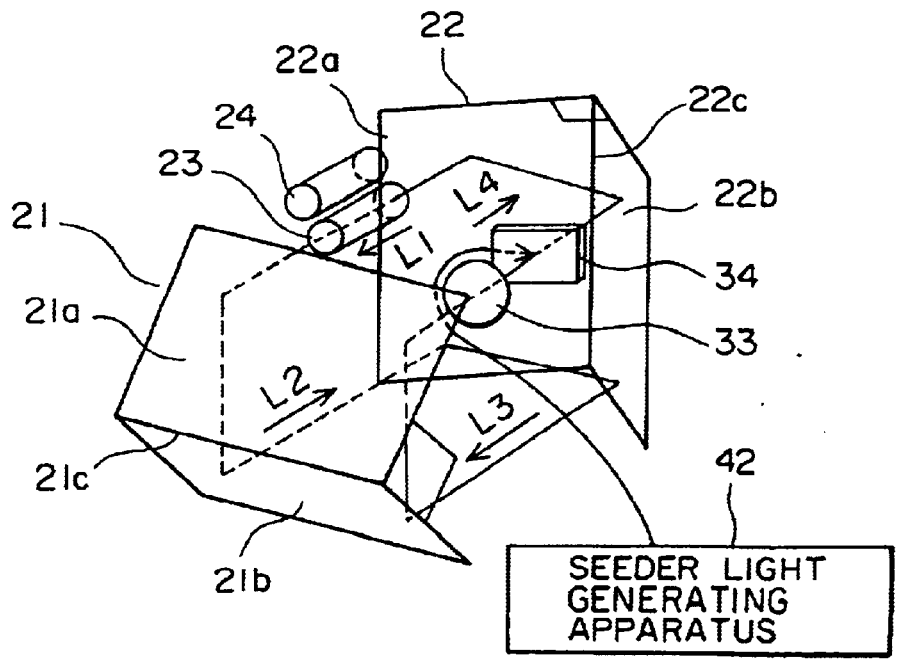
FIG. 14 is a schematic perspective view showing a self-compensating laser resonator according to Embodiment 11 of the present invention.

Next, FIG. 14 is a schematic perspective view showing a self-compensating laser resonator according to Embodiment 11 of the present invention. In the figure, a Seeder light generating apparatus 42 causes monochromatic light (i.e., Seeder light) to be incident. The Seeder light generating apparatus 42 causes Seeder light to be incident at an intersection of the polarizing reflecting mirror 34 and optical path L4 via, for example, a lightpath for Seeder light constructed by optical fiber (not shown). The incident Seeder light is reflected at the polarizing reflecting mirror 34 and travels along the optical path L4. The remaining construction is similar to that in Embodiment 7.

Next, the operation will be described. The exciting light source 24 excites the laser medium 23, and laser oscillation occurs in accordance with obtaining a stable mode of the laser resonator. However, only spontaneously emitted light, so-called fluorescent light, is first emitted from the excited laser medium 23 and a long time is required for this spontaneously emitted light to circuit inside the laser resonator and be gradually amplified. Moreover, various wavelenghts are contained in spontaneously emitted light and all of these wavelenghts are amplified.

Monochromatic Seeder light generated in the Seeder light generating apparatus 42 is made incident in the laser resonator when operation is commenced. The incident Seeder light circuits inside the laser resonator and is amplified and laser oscillation occurs in an oscillation mode in the same direction in which the Seeder light circuits. On the other hand, only the spontaneously emitted light circuits in a direction opposite that of the Seeder light and a long time is required for this spontaneously emitted light to be amplified such that laser oscillation occurs. Accordingly, before a stable mode circuiting in the direction opposite the Seeder light can oscillate the laser, laser oscillation is regulated to the same direction as the Seeder light because energy stored in the laser medium is consumed by laser excitation of a stable mode circuiting in the same as the Seeder light.

Thus, by making the Seeder light incident in the laser resonator, the direction in which the laser beam circuits the laser resonator may be regulated to only one direction, and a high quality laser beam may be obtained by means of monochromatic light. Furthermore, since the polarizing reflecting mirror 34 for laser output may be used for the incidence of the Seeder light, the direction in which the laser beam circuits may be regulated to only one direction with a small amount of optical components, the quality of the laser may be improved and the size of the laser resonator may be reduced.

Embodiment 12

Figure 15:
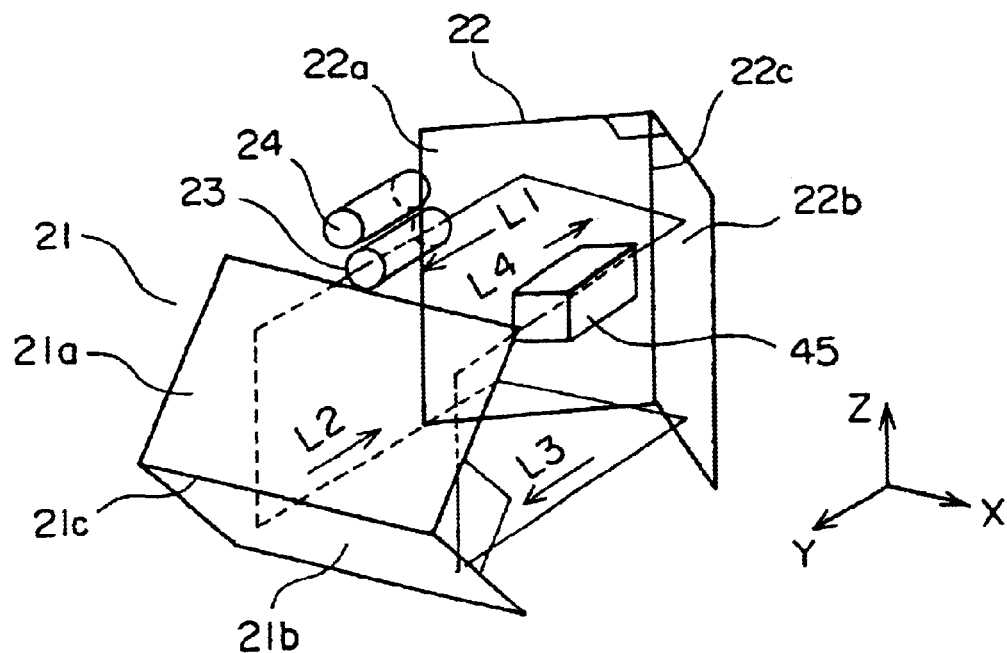
FIG. 15 is a schematic perspective view showing a self-compensating laser resonator according to Embodiment 12 of the present invention.
Figure 16:
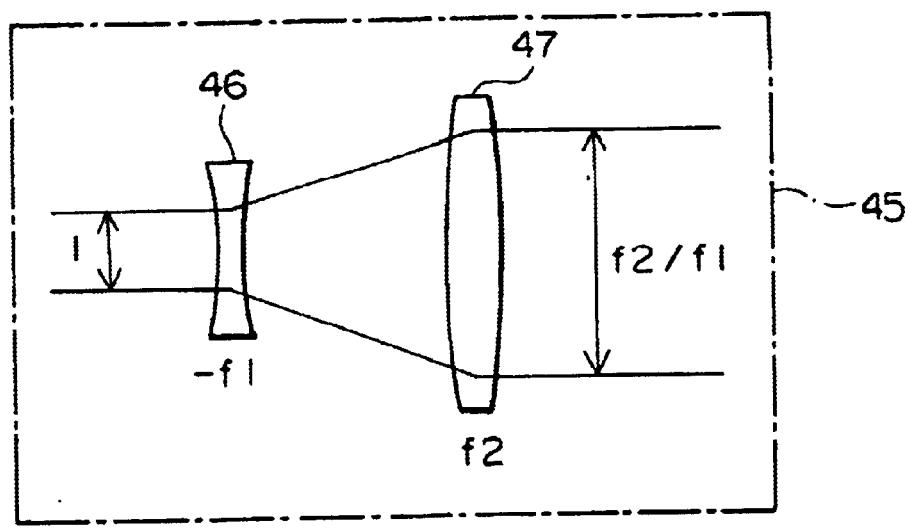
FIG. 16 is a block diagram showing an example of the beam diameter converting device in FIG. 15.

Next, FIG. 15 is a schematic perspective view showing a self-compensating laser resonator according to Embodiment 12 of the present invention. In the figure, a beam diameter converting device 45 for converting a beam diameter of a laser beam is provided in the optical path L4. The beam diameter converting device 45 includes, as shown in FIG. 16, a concave lens 46 and a convex lens 47.

Here, a focal length of the concave lens 46 is $-f1$, a focal length of the convex lens 47 is $f2$, there is an interval D between the concave lens 46 and the convex lens 47, and a focal length f of the beam diameter converting device 45 is: $f=(-f1 \times f2)/(-f1+f2-D)$. When $D=f2-f1$, the focal length of the beam diameter converting device is $\infty$, and when a beam diameter at a concave lens 46-side is 1, a beam diameter at a convex lens 47-side is changed by a factor of $f2/f1$. Accordingly, by appropriately selecting the focal length of the concave lens 46 and the convex lens 47, the beam diameter may be freely adjusted.

Since such an oscillation mode of the laser resonator is present in the beam diameter of the laser beam circuiting in the laser resonator, the oscillation mode of the laser resonator may be adjusted by adjusting the conversion ratio of the beam diameter converting device 45. Furthermore, by adjusting the oscillation mode of the laser resonator, the beam shape of the laser beam circuiting inside the laser resonator may be easily adjusted.

Furthermore, although the beam diameter converting device 45 is disposed in the optical path L4, it may be disposed in any one of optical paths L1 to L4.

Embodiment 13

Figure 17:
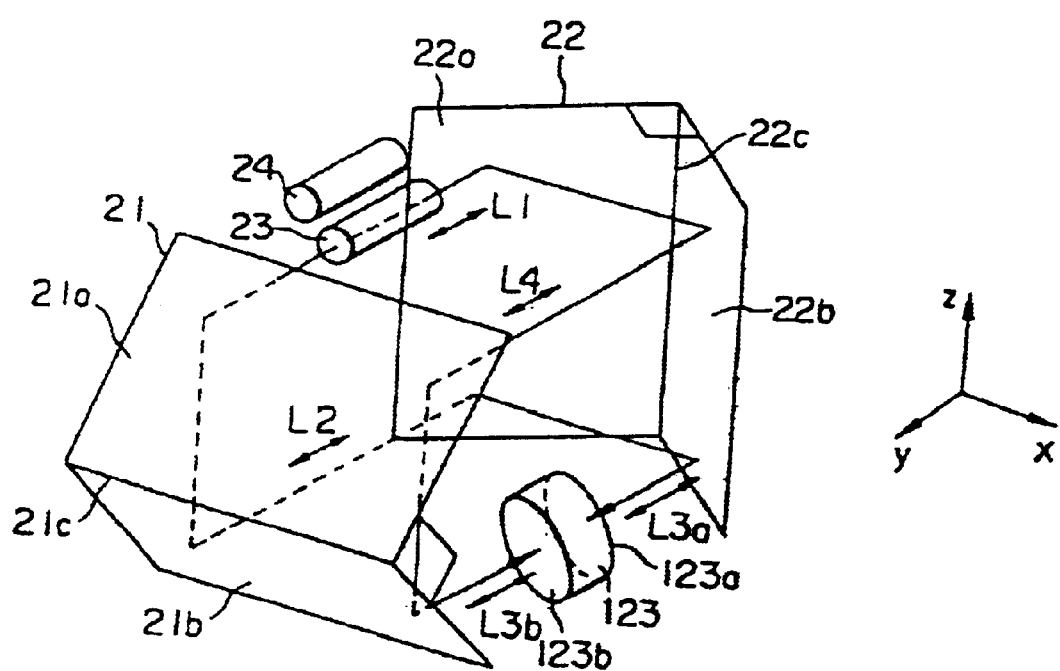
FIG. 17 is a schematic perspective view showing a self-compensating laser resonator according to Embodiment 13 of the present invention.
Figure 18:
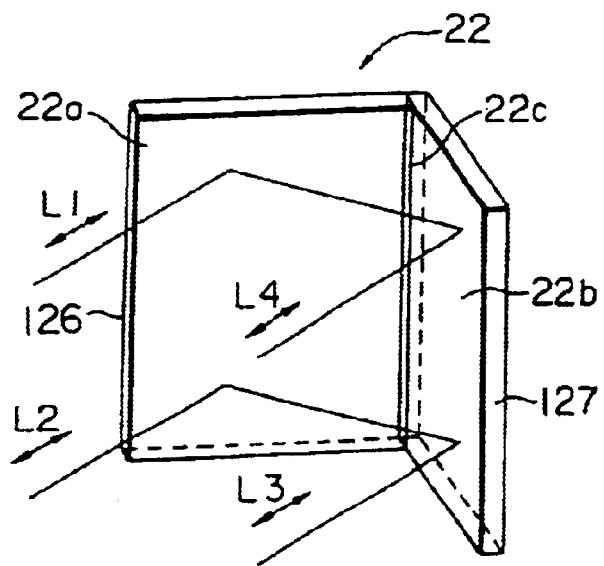
FIG. 18 is a perspective view showing an example of the first and second reflecting apparatus in FIG. 17.

FIG. 17 is a schematic perspective view showing a self-compensating laser resonator according to Embodiment 13 of the present invention. In FIG. 17, a first reflecting apparatus 21 has first and second reflecting surfaces 21a, 21b disposed at a right angle to each other, a second reflecting apparatus 22 facing the first reflecting apparatus 21 has third and fourth reflecting surfaces 22a, 22b disposed at a right angle to each other. As shown in FIG. 18 for example, the first and second reflecting apparatuses 21, 22 have two flat reflecting mirrors 126, 127 disposed at a right angle to each other. Furthermore, although only the second reflecting apparatus 22 is shown in FIG. 18, the first reflecting apparatus 21 has the same structure.

Moreover, a second ridge 22c formed by the third and fourth reflecting surfaces 22a, 22b is positioned on a plane substantially orthogonal to a first ridge 21c formed by the first and second reflecting surfaces 21a, 21b such that the first and second reflecting surfaces 21a, 21b and third and fourth reflecting surfaces 22a, 22b face each other. A third reflecting apparatus 123 having fifth and sixth reflecting surfaces 123a, 123b which are approximately parallel to each other is provided between the second reflecting surface 21b and fourth reflecting surface 22b, disposed such that the second reflecting surface 21b and sixth reflecting surface 123b, and the fourth reflecting surface 22b and the fifth reflecting surfaces 123a face each other, respectively. A laser medium 23 is provided between the first reflecting surface 21a and third reflecting surface 22a. A light source 24 excites the laser medium 23.

Next, the operation will be explained. After passing through the laser medium 23 and being amplified, a laser beam traveling along an optical path L1 is successively reflected by the first reflecting surface 21a and second reflecting surface 21b to travel in the opposite direction along an optical path L2 which is parallel to the optical path L1. The laser beam traveling along the optical path L2 is successively reflected by the third reflecting surface 22a and fourth reflecting surface 22b to travel in the direction opposite the optical path L2 along an optical path L3a which is parallel to the optical path L2. The laser beam traveling along the optical path L3a is then reflected by the fifth reflecting surface 123a of the third reflecting apparatus 123, that is, reflected in the direction opposite that of the incident laser beam, and travels along the optical paths L3a, L2, and L1 to again enter the laser medium 23.

After again passing through the laser medium 23 and being further amplified, the laser beam is successively reflected by the third reflecting surface 22a and fourth reflecting surface 22b to travel in the opposite direction along an optical path L4 which is parallel to the optical path L1. The laser beam traveling along the optical path L4 is successively reflected by the first reflecting surface 21a and second reflecting surface 21b to travel in the direction opposite the optical path L4 along an optical path L3b which is parallel to the optical path L4. The laser beam traveling along the optical path L3b is then reflected by the sixth reflecting surface 123b of the third reflecting apparatus 123, that is, reflected in the direction opposite that of the incident laser beam, and travels along the optical paths L3b, L4, and L1 to be further amplified by the laser medium 23. Hence, the laser beam is not incident on the ridges 21c, 22c of the first and second reflecting apparatuses 21,22, and is confined and gradually amplified in the laser resonator. That is to say, the laser beam emanating from the laser medium 23 returns to the laser medium 23 along the same optical path and is confined as a standing wave to thus constitute a standing wave type laser resonator.

Next, taking the above laser resonator as an example, a shift in the polarization of the laser beam in the resonator will be considered. First, when the laser beam is reflected by a flat surface, a P polarization component vibrates within a plane that includes the incident beam and the reflected beam and an S polarization component vibrates orthogonal to a plane that includes the incident and reflected beam. Generally, the amount of phase shift in a laser beam incident on a reflecting surface at any angle other than orthogonal differs by the P polarization component and S polarization component. Accordingly, when a laser is reflected by the reflecting surfaces 21a, 22b of the first reflecting apparatus, since the amount of phase shift differs depending on the P polarization component and S polarization component, the polarization of the laser beam in the optical path L1 is shifted in the optical path L2, except in the cases where, for example, the polarization in the optical path L1 with respect to the reflecting surface 21a is only the P polarization component or only the S polarization component.

Here, an X-axis component and Z-axis component of an arbitrary polarization in the optical path L1 are defined as Ex and Ez, respectively, and the polarization of a laser beam transmitted from the optical path L1 to the optical path L3a will be considered. During transmission of the X-axis component Ex of the laser beam from the optical path L1 to the optical path L3a, the X-axis component Ex is reflected twice by the first reflecting apparatus 21 with an S polarization and twice by the second reflecting apparatus 22 with a P polarization. Moreover, in transmission of the Z-axis component Ez of the laser beam from the optical path L1 to the optical path L3a, the Z-axis component Ez is reflected twice by the first reflecting apparatus 21 with a P polarization and twice by the second reflecting apparatus 22 with an S polarization.

Since the X-axis component Ex and the Z-axis component Ez each receive two phase shifts due to P polarization reflection and two phase shifts due to S polarization reflection in an equal amount, the polarization state in optical path L1 is maintained in optical path L3a. Accordingly, for a laser beam of an arbitrary polarization state, the same polarization is maintained among the optical paths L1, L3a, L3b, and between the optical path L2 and the optical path L4. The change in polarization due to reflection by an optical component can be canceled-out by disposing the optical component in the optical paths L1, L3a and L3b which are diagonally positioned relative to each other, or the optical paths L2 and L4 which are also diagonally positioned relative to each other, and thus, design of the laser resonator is facilitated.

In a self-compensating laser resonator constructed as above, since the laser beam is not incident on the ridges 21c, 22c of the reflecting apparatuses 21, 22 there is no loss due to diffraction at the ridges 21c, 22c, and thus, it is possible to prevent the utilization efficiency of the laser beam from being lowered. Also, since the laser beam is not split by the ridges 21c, 22c, the quality of the laser is improved. Moreover, since the five (5) optical paths can be arranged in parallel, the laser resonator can be realized with a small size. Still further, because the flat reflecting mirrors 126, 127 are light-weight, the weight of the reflecting apparatuses 21, 22, as well as that of the entire laser resonator can be further reduced. Also, since there is no phase shift in diagonal optical paths due to reflection at the reflecting surfaces 21a, 21b, 22a, 22b, the design of the laser resonator is facilitated. Furthermore, because a standing wave laser resonator wherein a laser beam travels back along the same optical path to return to the laser medium is constructed, the utilization efficiency of stored energy in the laser medium is prevented from being lowered.

Moreover, although in the above example the laser medium 23 is disposed in the optical path L1, the laser medium 23 may be disposed in any of the optical paths L1 to L4. Also, a plurality of laser mediums 23 and excitation light sources 24 may be disposed in a plurality of optical paths. Furthermore, although in the above example the third reflecting apparatus 123 is disposed in the optical paths L3a, L3b, it may be disposed in any of the optical paths L1 to L4.

Embodiment 14

Figure 19:
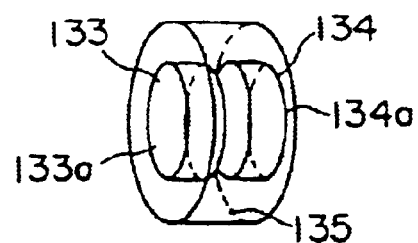
FIG. 19 is a perspective view showing a third reflecting apparatus of a self-compensating laser resonator according to Embodiment 14 of the present invention.

FIG. 19 is a perspective view showing a third reflecting apparatus of a self-compensating laser resonator according to Embodiment 14 of the present invention. In this embodiment, two single-sided reflecting mirrors 133, 134 mutually fixed by a reflecting mirror holder 135 are used as a replacement for the third reflecting apparatus 123 of FIG. 17. The two single-sided reflecting mirrors 133, 134 are mutually fixed by a holder and disposed such that reflecting surfaces 133a, 134a thereof are approximately parallel and face away from each other. The rest of the construction is the same as Embodiment 13.

Although the reflecting surfaces 21a, 21b of the first reflecting apparatus 21 and the reflecting surfaces 22a, 22b of the second reflecting apparatus 22 are disposed so as to be at approximately right angles to each other, disposing these surfaces at perfect right angles is both difficult and expensive. In such a case, a difference in angle between the optical path L3a and the optical path L3b occurs. In the present embodiment, it is possible to fix reflecting surfaces 133a, 134a using the reflecting mirror holder 135 so as to compensate for this difference in angle.

In a self-compensating laser resonator constructed as above, the two single-sided reflecting mirrors 133, 134 mutually fixed by a reflecting mirror holder 135 are used as the third reflecting apparatus. Therefore, it is possible to construct a self-compensating laser resonator even when the angles formed by the reflecting surfaces 21a, 21b of the first reflecting apparatus 21 and the reflecting surfaces 22a, 22b of the second reflecting apparatus 22 deviate from being right angles.

Embodiment 15

Figure 20:
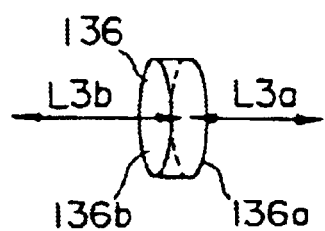
FIG. 20 is a perspective view showing a third reflecting apparatus of a self-compensating laser resonator according to Embodiment 15 of the present invention.

FIG. 20 is a perspective view showing a third reflecting apparatus of a self-compensating laser resonator according to Embodiment 15 of the present invention. In this embodiment, a two-sided reflecting mirror 136 having a reflecting surface 136a and an antireflection surface 136b is used as a replacement for the third reflecting apparatus 123 of FIG. 1. The rest of the construction is the same as Embodiment 13.

A laser beam incident on the reflecting surface 136a of the two-sided reflecting mirror 136 from the optical path L3a is reflected by the reflecting surface 136a in the opposite direction of the incident laser beam. On the other hand, A laser beam incident from the optical path L3b passes through the antireflection surface 136b and is reflected by the rear surface of reflecting surface 136a to again pass through the antireflection surface 136b and travel in the opposite direction of the incident laser beam. Accordingly, since the laser beam is reflected by the front and rear surface of the same reflecting surface, it is possible to construct a stable self-compensating laser resonator which does not have any difference in angle between the two surfaces.

Embodiment 16

Figure 21:
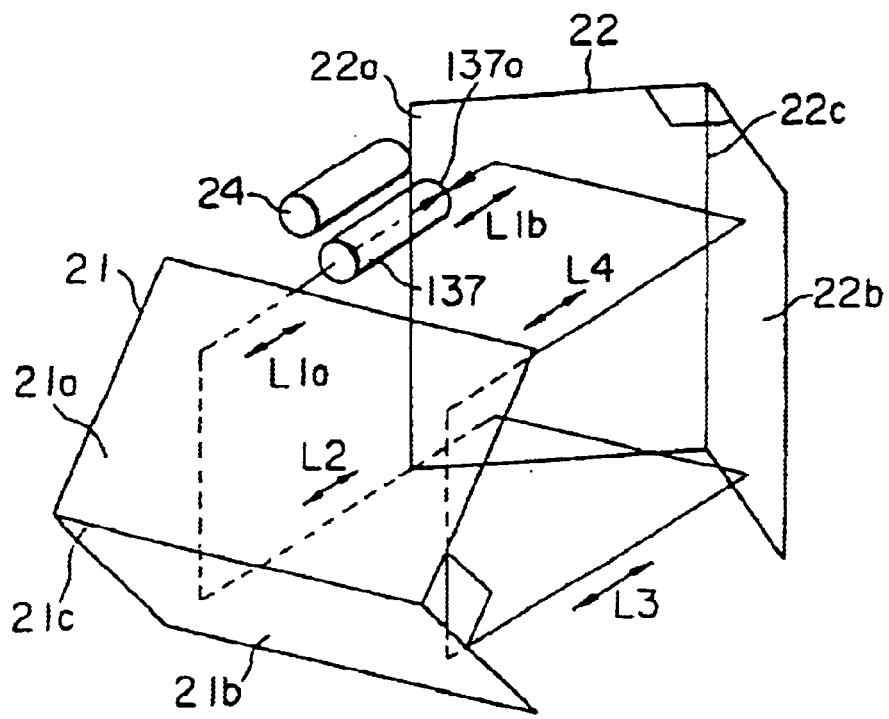
FIG. 21 is a schematic perspective view showing a self-compensating laser resonator according to Embodiment 16 of the present invention.

FIG. 21 is a schematic perspective view showing a self-compensating laser resonator according to Embodiment 16 of the present invention. In FIG. 21, a laser medium 137 has a two-sided reflecting surface 137a on one end surface thereof. The laser medium 137 is disposed between the first reflecting surface 21a and the third reflecting surface 22a. The two-sided reflecting surface 137a reflects a laser beam with both the front and rear surface thereof.

Next, the operation will be explained. After passing through the laser medium 137 and being amplified, a laser beam traveling from the laser medium 137 toward the first reflecting surface 21a is successively reflected by the first reflecting surface 21a and second reflecting surface 21b to travel in the opposite direction along an optical path L2 which is parallel to an optical path L1a. The laser beam traveling along the optical path L2 is successively reflected by the third reflecting surface 22a and fourth reflecting surface 22b to travel in the direction opposite the optical path L2 along an optical path L3 which is parallel to the optical path 12. The laser beam traveling along the optical path L3 is successively reflected by the second reflecting surface 21b and first reflecting surface 21a to travel in the direction opposite the optical path L3 along an optical path L4 which is parallel to the optical path L3. The laser beam traveling along the optical path L4 is successively reflected by the fourth reflecting surface 22b and third reflecting surface 22a to travel in the direction opposite the optical path L4 along an optical path L1b which is parallel to the optical path L4. The laser beam traveling along the optical path L1b is then reflected by the two-sided reflecting surface 137a provided on one end of the laser medium 137. That is to say, the laser beam is reflected in the opposite direction of the incident laser beam, travels along the optical paths L1b, L4, L3, L2 and L1a to again enter the laser medium 137, and, after being further amplified, is reflected by the two-sided reflecting surface 137a so as to be confined in the laser resonator.

In the self-compensating laser resonator constructed as above, since the laser beam is reflected by the front and rear surface of the same reflecting surface, it is possible to construct a stable standing wave self-compensating laser resonator which does not have any difference in angle between the two surfaces. Also, since the number of optical components required for the third reflecting apparatus 123 of FIG. 17 is reduced, loss in the laser beam can be suppressed.

Moreover, optical components not shown in the drawing, such as a polarizer, wave board, Pockels cell and the like, are also disposed in the laser resonator. Although in the above embodiment the two-sided reflecting surface 137a is provided on one end of the laser medium 137, a two-sided reflecting surface may be provided on one end of any one of an optical components such as the polarizer, wave board, Pockels cell and the like, which may then be positioned in any of the optical paths L1 to L4.

Embodiment 17

Figure 22:
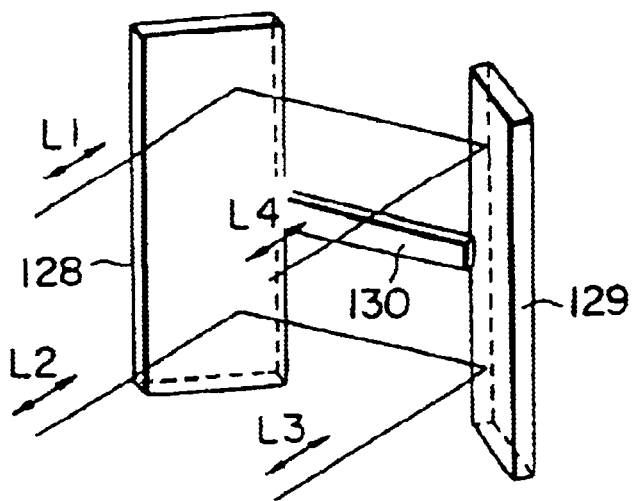
FIG. 22 is a perspective view showing a first and second reflecting apparatus of a self-compensating laser resonator according to Embodiment 17 of the present invention.

In a self-compensating laser resonator constructed as above, the ridge portions 21c, 22c of the flat reflecting mirrors 126, 127 may be eliminated so that the laser beam will not be incident thereon. Namely, as shown in FIG. 22, flat reflecting mirrors 128, 129 having a surface area smaller than those shown in FIG. 18 are disposed with a gap therebetween, and may be joined by means of a joining member 130. With a construction such as this, the size and weight of the laser resonator can be further reduced.

Embodiment 18

Figure 23:
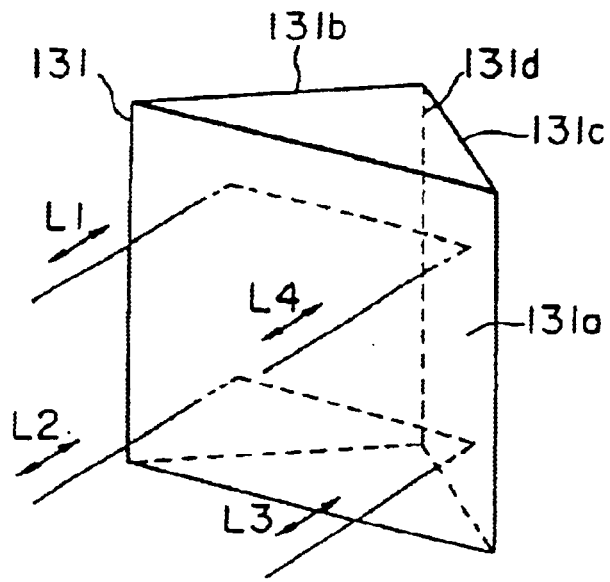
FIG. 23 is a perspective view showing a first and second reflecting apparatus of a self-compensating laser resonator according to Embodiment 18 of the present invention.

FIG. 23 is a perspective view showing a first and second reflecting apparatus of a self-compensating laser resonator according to Embodiment 18 of the present invention. In the present embodiment, a roof prism 131 is used as a replacement for the reflecting apparatuses 21, 22 of FIG. 17. The roof prism 131 has an incident surface 131a on which a laser beam is incident, two reflecting surfaces 131b, 131c disposed orthogonally to each other, and a ridge 131d. Also, 45 degree angles are formed between the incident surface 131a and each of the reflecting surfaces 131b, 131c. Furthermore, surfaces besides the incident surface 131a and the reflecting surfaces 131b, 131c (the upper and lower surfaces in FIG. 23) may have an arbitrary shape and angle so long as this does not interfere with the portions through which the laser beam passes. The rest of the construction is the same as in any of Embodiments 13 to 16.

Next, the operation will be explained. A laser beam passes through the incident surface 131a and is completely reflected by the reflecting surface 131b. The laser beam completely reflected by the reflecting surface 131b is completely reflected by the reflecting surface 131c parallel to, and in the opposite direction of, the incident laser beam to emerge from the incident surface 131a.

Accordingly, a self-compensating laser resonator wherein the laser beam is not incident on the ridge 131d can also be constructed in the case where the roof prism is used as the reflecting apparatuses 21, 22. Moreover, lowering of the utilization efficiency of the laser can be prevented and the quality thereof can be improved with a simple structure. Furthermore, since it is difficult for a difference in angle to occur between reflecting surfaces 131b, 131c, it is possible to obtain a stable self-compensating laser resonator.

Embodiment 19

Figure 24:
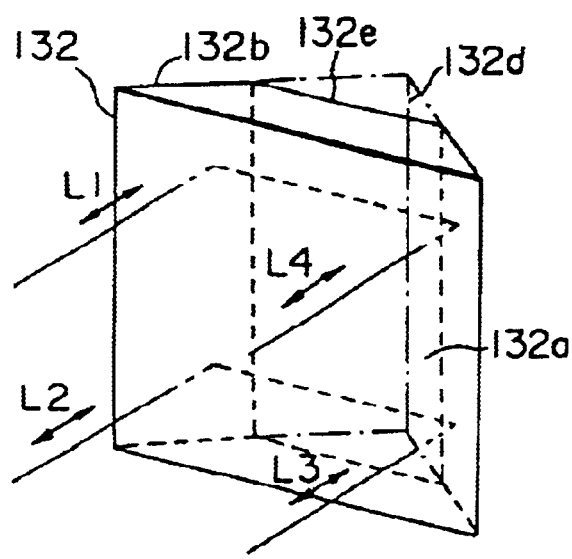
FIG. 24 is a perspective view showing a first and second reflecting apparatus of a self-compensating laser resonator according to Embodiment 19 of the present invention.

Although the prism 131 having the ridge 131d is described in the above Embodiment 18, as shown in FIG. 24 for example, a prism may have a trapezoidal cross-section. That is, in a prism 132 having an incident surface 132a and reflecting surfaces 132b, 132c disposed at a right angle to each other, a portion in the vicinity of a ridge 132d formed by two planes including the reflecting surfaces 132b, 132c is eliminated so that the laser beam will not pass there-through. Moreover, a cut surface 132e may have an arbitrary shape and angle so long as this does not interfere with the portions through which the laser beam passes. Accordingly, by using a roof prism wherein the portion in the vicinity of the ridge 132d is cut-away, the weight and size of the entire laser resonator can be reduced.

Embodiment 20

Figure 25:
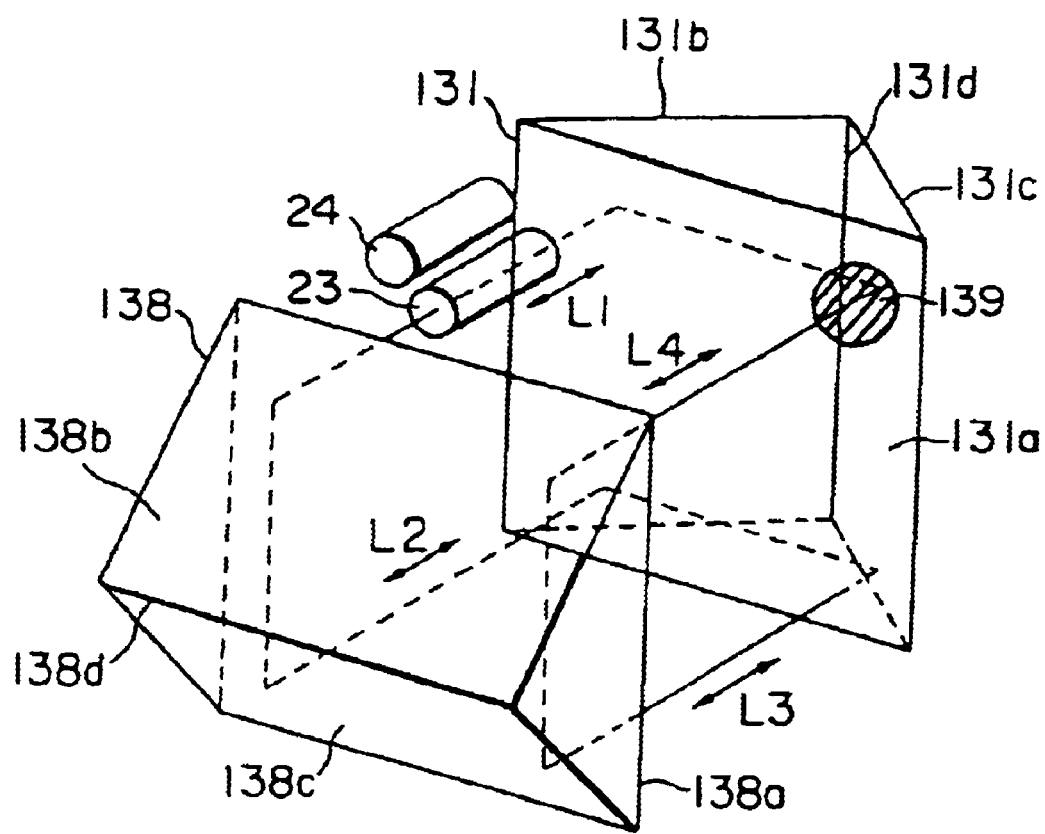
FIG. 25 is a schematic perspective view showing a self-compensating laser resonator according to Embodiment 20 of the present invention.
Figure 26:
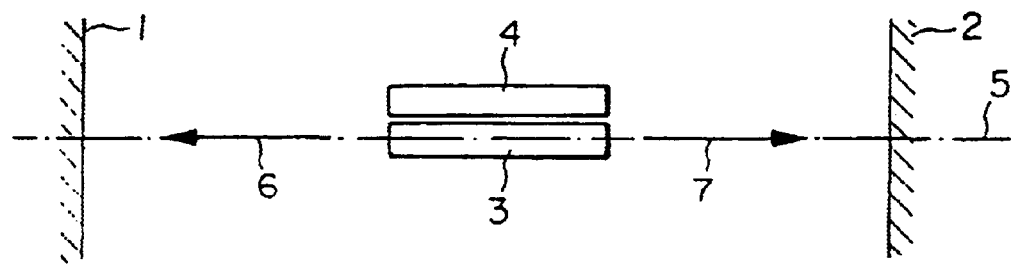
FIG. 26 is an explanatory drawing showing an example of a conventional laser resonator.
Figure 27:
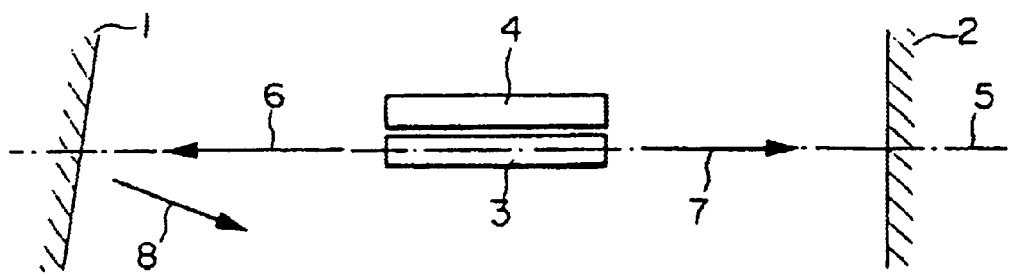
FIG. 27 is an explanatory drawing showing the case where one of the reflecting mirrors in FIG. 23 is inclined.
Figure 28:
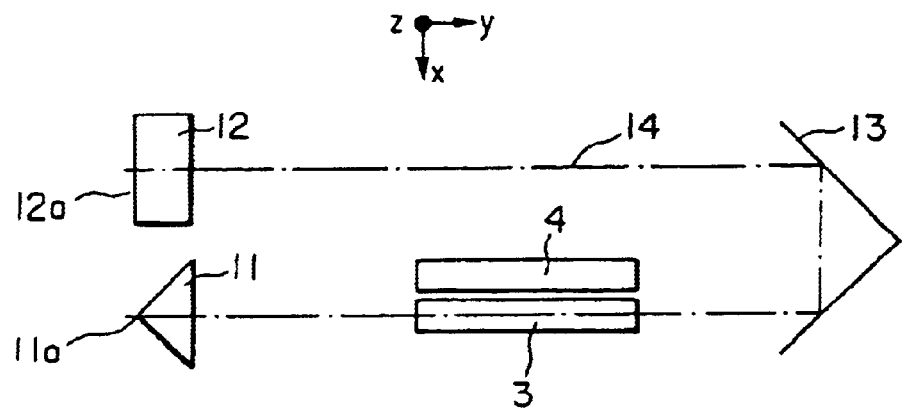
FIG. 28 is an explanatory drawing showing an example of a conventional self-compensating laser resonator.
Figure 29:
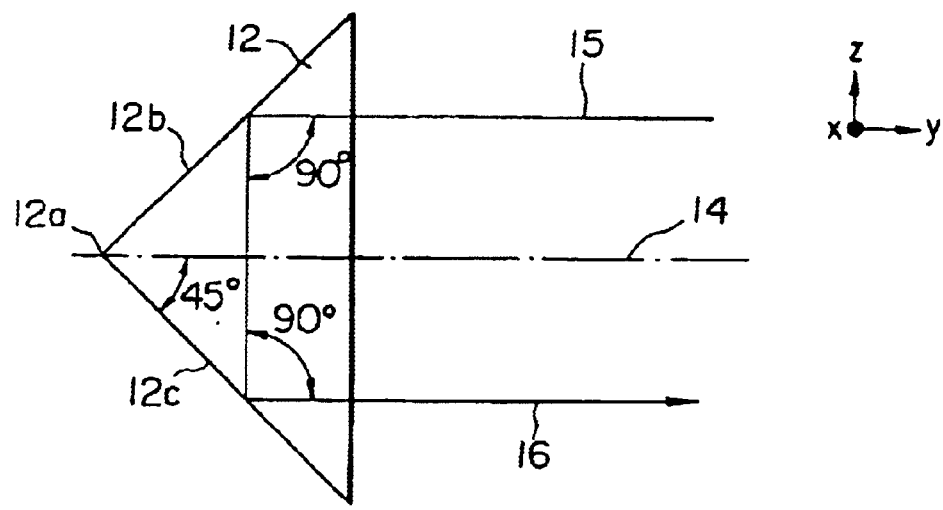
FIG. 29 is an explanatory drawing showing the reflected state of a laser beam incident on the roof prism of FIG. 25.
Figure 30:
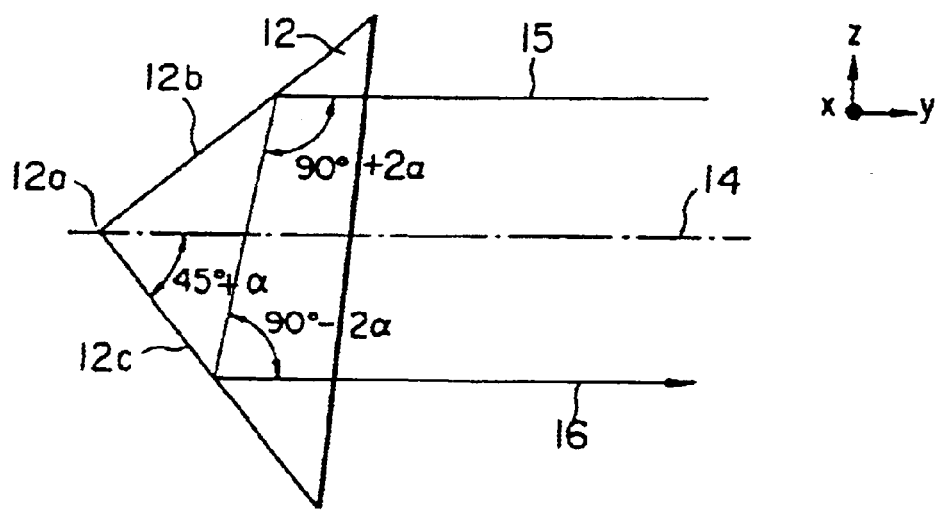
FIG. 30 is an explanatory drawing showing the inclined state of the roof prism of FIG. 26.

FIG. 25 is a schematic perspective view showing a self-compensating laser resonator according to Embodiment 20 of the present invention. In FIG. 25, roof prisms 131, 138 are the same as those described in Embodiment 18. The roof prism 131 according to the present embodiment has a two-sided reflecting surface 139, on which a laser beam is incident, at a portion where the incident surface 131a and the optical path L4 intersect. The two-sided reflecting surface 139 reflects a laser beam at a front surface and a rear surface thereof.

Next, the operation will be explained. After passing through the laser medium 23 and being amplified, a laser beam traveling from the laser medium 23 toward a reflecting surface 138b enters an incident surface 138a and is successively reflected by the reflecting surface 138b and a reflecting surface 138c to travel in the opposite direction along an optical path L2 which is parallel to an optical path L1. The laser beam traveling along the optical path L2 enters an incident surface 131a and is successively reflected by a reflecting surface 131b and a reflecting surface 131c to travel in the direction opposite the optical path L2 along an optical path L3 which is parallel to the optical path L2. The laser beam traveling along the optical path L3 is successively reflected by the reflecting surface 138b and the reflecting surface 138a to travel in the direction opposite the optical path L3 along an optical path L4 which is parallel to the optical path L3. The laser beam traveling along the optical path L4 is reflected by the two-sided reflecting surface 139. That is to say, the laser beam is reflected in the opposite direction of the incident laser beam, travels along the optical paths L4, L3, L2 and L1 to again enter the laser medium 23.

Furthermore, after entering and passing through the laser medium 23 again, and being further amplified, the laser beam enters the incident surface 131a and is successively reflected by the reflecting surface 131b and the reflecting surface 131c. The laser beam is the reflected by the two-sided reflecting surface 139 in opposite direction of the incident laser so as to be confined and amplified in the laser resonator.

In the self-compensating laser resonator constructed as above, since the laser beam is reflected by the front and rear surface of the same reflecting surface, it is possible to construct a stable standing wave self-compensating laser resonator which does not have any difference in angle between the two surfaces. Also, since the number of optical components required for the third reflecting apparatus 123 of FIG. 17 is reduced, loss in the laser beam can be suppressed.

Moreover, although in the above embodiment the two sided reflecting surface 139 is provided at a portion where the incident surface 131*a* and the optical path L4 intersect, the two-sided reflecting surface 139 may be provided at any intersection between the optical paths L1 to L4 and the incident surfaces 131*a* and 132*b*. Furthermore, although the roof prisms 131, 138 used are those described in Embodiment 18, the roof prisms described in Embodiment 19, wherein the portions in the vicinity of the ridges are removed, may also be used.

According to one aspect of the present invention there is provided a self-compensating laser resonator including: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a laser medium provided between the first reflecting surface and the third reflecting surface; and a light source for exciting the laser medium, wherein, a second ridge formed by two planes including the third and fourth reflecting surfaces is on a plane substantially orthogonal to a first ridge formed by two planes including the first and second reflecting surfaces, characterized in that, a laser beam emanating from the laser medium and traveling toward the first reflecting surface is successively reflected by the first, second, third, fourth, second, first, fourth and third reflecting surfaces to again enter the laser medium. Thus, since the laser beam is not incident on the ridges of the reflecting apparatuses there is no loss due to diffraction thereat and it is possible to prevent the utilization efficiency of the laser beam from being lowered. Also, since the laser beam is not split by the ridges the quality of the laser is improved. The laser resonator is of simple construction and thus may be realized in a small size.

According to another aspect of the present invention, an isolator which allows a laser beam to pass there-through in only one direction is provided in an optical path of the a laser beam. Thus, the direction of the laser beam circuiting inside the laser resonator may be regulated to one direction and the laser beam may be stabilized.

According to yet another aspect of the present invention, a partially reflective mirror used for laser output is provided at any one of first to fourth reflecting surfaces. Hence, the output of the laser beam may be facilitated with a simple construction.

According to still another aspect of the present invention, polarizing reflecting means for selectively allowing to pass there-through to be output to an outside portion any one of a P polarization component and an S polarization component of a laser beam while reflecting the other component is provided at any one of the first to fourth reflecting surfaces, and polarization component adjusting means for dividing the laser beam relative to polarizing reflecting means into the P polarization component and the S polarization component at an arbitrary ratio is provided in an optical path of the laser beam. Thus, the ratio of the laser beam output to the outside of the laser resonator may be optionally changed.

According to still yet another aspect of the present invention, polarizing reflecting means for selectively allowing to pass there-through any one of a P polarization component and an S polarization component of a laser beam while reflecting the other component to be output to an outside portion is provided, and polarization component adjusting means for dividing the laser beam relative to polarizing reflecting means into the P polarization component and the S polarization component at an arbitrary ratio is provided in an optical path of the laser beam. Thus, the ratio of the laser beam output to the outside of the laser resonator may be optionally chanced.

According to yet another aspect of the present invention, an isolator for passing a laser beam there-through in only one direction, including, two polarization component adjusting means for selectively allowing to pass there-through any one of a P polarization component and an S polarization component of a laser beam while reflecting the other component to be output to an outside portion, a Faraday rotator and a half wave plate, and, polarization component adjusting means for dividing the laser beam relative to polarizing reflecting means into the P polarization component and the S polarization component at an arbitrary ratio is provided. Thus, the ratio of the laser beam output to the outside of the laser resonator may be optionally changed, the direction of the laser beam circuiting inside the laser resonator may be regulated to one direction and the laser beam may be stabilized. Also, since the first polarization reflecting means of the isolator can also be used for laser output, the number of optical components may be reduced, and loss in the laser beam can be reduced while at the same time reducing the size of the entire laser resonator.

According to still yet another aspect of the present invention, polarization component adjusting means is a half wave plate. Hence, the laser beam by divided at an arbitrary ration into the P polarization component and the S polarization component with a simple construction.

According to still yet another aspect of the present invention, polarization component adjusting means is a birefringent optical element capable of achieving a birefringence effect in accordance with an applied voltage. Thus, the ratio of the P polarization component and the S polarization component may be easily adjusted.

According to still yet another aspect of the present invention, a Seeder light generating apparatus for making Seeder light incident in an optical path of a laser beam reflected from polarization reflecting means is provided. Thus, by making the Seeder light incident in the laser resonator, the direction in which the laser beam circuits the laser resonator may be regulated to only one direction, and a high quality laser beam may be obtained by means of monochromatic light. Furthermore, since the polarizing reflecting means for laser output may be used for the incidence of the Seeder light, the direction in which the laser beam circuits may be regulated to only one direction with a small amount of optical components, the quality of the laser may be improved and the size of the laser resonator may be reduced.

According to still yet another aspect of the present invention a beam diameter converting device for converting a beam diameter of a laser beam is provided. Thus, by adjusting the oscillation mode of the laser resonator, the beam shape of the laser beam circuiting inside the laser resonator may be easily adjusted.

According to still yet another aspect of the present invention there is provided a self compensating laser resonator comprising: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a third reflecting apparatus provided between the second reflecting surface and the fourth reflecting surface, having a fifth reflecting surface and a sixth reflecting surface disposed parallel to, and facing away from, each other; a laser medium provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, fifth, fourth, third, second and first reflecting surfaces to again enter the laser medium, passes through the laser medium, and is further successively reflected by the third, fourth, first, second, sixth, second, first, fourth and third reflecting surfaces to once again enter the laser medium. Therefore, the laser beam is not incident on the ridges and there is no loss due to diffraction thereat, and thus, it is possible to prevent the utilization efficiency of the laser beam from being lowered. Also, since the laser beam is not split by the ridges, the quality of the laser is improved. Moreover, the laser resonator can be realized with a small size. Also, since there is no phase shift in diagonal optical paths due to reflection at the reflecting surfaces, the design of the laser resonator is facilitated. Furthermore, because a standing wave laser resonator wherein a laser beam travels back along the same optical path to return to the laser medium is constructed, the utilization efficiency of stored energy in the laser medium is prevented from being lowered.

According to still yet another aspect of the present invention, the third reflecting apparatus comprises two single-sided reflecting mirrors mutually fixed by a holder and disposed such that the reflecting surfaces thereof are parallel and face in opposite directions from each other. Therefore, it is possible to construct a self-compensating laser resonator even when the angles formed by the reflecting surfaces of the respective first and second reflecting apparatuses deviate from being right angles. Furthermore, the cost of the self-compensating laser resonator can be lowered.

According to still yet another aspect of the present invention, the third reflecting apparatus comprises a reflecting mirror having a two-sided reflecting surface on one surface thereof for reflecting a laser beam with a front surface and a rear surface. Therefore, it is possible to construct a stable self-compensating laser resonator which does not have any difference in angle between the reflecting surfaces.

According to still yet another aspect of the present invention, there is provided a self-compensating laser resonator comprising: a first reflecting apparatus having the first reflecting surface and a second reflecting surface disposed at a right angle to each other; a second reflecting apparatus facing the first reflecting apparatus and having a third reflecting surface and a fourth reflecting surface disposed at a right angle to each other; a laser medium having a seventh two-sided reflecting surface on an optical axis of a laser beam on one end surface thereof provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, second, first, fourth, third and seventh two-sided reflecting surfaces, and is further successively reflected by the third, fourth, first, second, fourth, third, second and first reflecting surfaces to again enter the laser medium, passes through the laser medium and is reflected by the seventh two-sided reflecting surface. Therefore, the laser beam is not incident on the ridges and there is no loss due to diffraction thereat, and thus, it is possible to prevent the utilization efficiency of the laser beam from being lowered. Also, since the laser beam is not split by the ridges, the quality of the laser is improved. Moreover, the laser resonator can be realized with a small size. Also, since there is no phase shift in diagonal optical paths due to reflection at the reflecting surfaces, the design of the laser resonator is facilitated. Furthermore, because a standing wave laser resonator wherein a laser beam travels back along the same optical path to return to the laser medium is constructed, the utilization efficiency of stored energy in the laser medium is prevented from being lowered. Also, since the laser beam is reflected at both sides of a singular reflecting surface of the laser medium, it is possible to construct a stable standing wave type self-compensating laser resonator which does not have any difference between the reflecting surfaces. Moreover, loss of the laser beam can be suppressed because the number of optical components is reduced.

According to still yet another aspect of the present invention, a self-compensating laser resonator is comprising: a first reflecting apparatus having a first reflecting surface and a second reflecting surface disposed at a right angle to each other; a second reflecting apparatus facing the first reflecting apparatus and having a third reflecting surface and a fourth reflecting surface disposed at a right angle to each other; a laser medium provided between the first reflecting surface and the third reflecting surface; a light source for exciting the laser medium; and an optical component having an eighth two-sided reflecting surface on an optical axis of the laser beam on one end surface thereof provided between the second reflecting surface and the fourth reflecting surface, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, eighth two-sided, fourth, third, second and first reflecting surfaces to again enter the laser medium, passes through the laser medium, is further successively reflected by the third, fourth, first and second reflecting surfaces to be incident on the optical component, and is further successively reflected by the eighth two-sided, second, first, fourth and third reflecting surfaces to once again enter the laser medium. Therefore, the laser beam is not incident on the ridges and there is no loss due to diffraction thereat, and thus, it is possible to prevent the utilization efficiency of the laser beam from being lowered. Also, since the laser beam is not split by the ridges, the quality of the laser is improved. Moreover, the laser resonator can be realized with a small size. Also, since there is no phase shift in diagonal optical paths due to reflection at the reflecting surfaces, the design of the laser resonator is facilitated. Furthermore, because a standing wave laser resonator wherein a laser beam travels back along the same optical path to return to the laser medium is constructed, the utilization efficiency of stored energy in the laser medium is prevented from being lowered. Also, since the laser beam is reflected at both sides of a singular reflecting surface of the laser medium, it is possible to construct a stable standing wave type self-compensating laser resonator which does not have any difference between the reflecting surfaces. Moreover, loss of the laser beam can be suppressed because the number of optical components is reduced.

According to still yet another aspect of the present invention, the first reflecting apparatus and second reflecting apparatus each have two flat reflecting mirrors disposed at a right angle to each other. Therefore, the weight of the entire laser resonator can be reduced.

According to still yet another aspect of the present invention, the two flat reflecting mirrors disposed at a right angle to each other are disposed with a gap therebetween and are joined to one another by means of a joining member. Therefore, it is not necessary to fix the two flat reflecting mirrors such that they directly intersect, and the size and weight of the reflecting apparatus can be reduced.

According to still yet another aspect of the present invention, the first reflecting apparatus and second reflecting apparatus each comprise a prism having two reflecting surfaces disposed at right angles to each other and an incident surface of the laser beam. Therefore, it is difficult for a difference in angle to occur between the reflecting surfaces, and it is possible to obtain a stable self-compensating laser resonator.

According to still yet another aspect of the present invention, a self-compensating laser resonator is comprising: a first prism having first and second reflecting surfaces disposed at right angles to each other and a first incident surface of the laser beam; a second prism facing said first prism and having third and fourth reflecting surfaces disposed at right angles to each other and a second incident surface of the laser beam, and provided with a ninth two-sided reflecting surface on an optical path of the laser beam incident on the second incident surface; a laser medium provided between the first reflecting surface and the third reflecting surface; and a light source for exciting the laser medium, wherein, a second ridge formed by two planes comprising the third and fourth reflecting surfaces is on a plane substantially orthogonal to a first ridge formed by two planes comprising the first and second reflecting surfaces, characterized in that, a laser beam emanating from the laser medium and traveling toward the first reflecting surface is successively reflected by the first, second, third, fourth, second, first, ninth two-sided, first, second, fourth, third, second and first reflecting surfaces to again enter the laser medium, passes through the laser medium, and is further successively reflected by the third, fourth, ninth two-sided, fourth and third reflecting surfaces to once again enter the laser medium. Therefore, the laser beam is not incident on the ridges and there is no loss due to diffraction thereat, and thus, it is possible to prevent the utilization efficiency of the laser beam from being lowered. Also, since the laser beam is not split by the ridges, the quality of the laser is improved. Moreover, the laser resonator can be realized with a small size. Also, since there is no phase shift due to reflection at the reflecting surfaces in diagonal optical paths, the design of the laser resonator is facilitated. Furthermore, because a standing wave laser resonator wherein a laser beam travels back along the same optical path to return to the laser medium is constructed, the utilization efficiency of stored energy in the laser medium is prevented from being lowered. Also, since the laser beam is reflected at both sides of a singular reflecting surface of the laser medium, it is possible to construct a stable standing wave type self-compensating laser resonator which does not have any difference between the reflecting surfaces. Moreover, loss of the laser beam can be suppressed because the number of optical components is reduced.

According to still yet another aspect of the present invention, the first and second ridges of the first and second prisms are eliminated. Therefore, it is possible to reduce the size and weight of the reflecting apparatus.

What is claimed is:

1. A self-compensating laser resonator comprising:
   a first reflecting apparatus having a first reflecting surface and a second reflecting surface disposed at a right angle to each other and intersecting at a first ridge line;
   a second reflecting apparatus having a third reflecting surface and a fourth reflecting surface disposed at a right angle to each other and intersecting at a second ridge line, said second reflecting apparatus facing said first reflecting apparatus such that the first through fourth reflecting surfaces are facing each other;
   a laser medium provided between said first reflecting surface and said third reflecting surface; and
   a light source for exciting said laser medium,
   wherein the first ridge line is substantially orthogonal to the second ridge line where a laser beam emanating from said laser medium travels along an optical path to said first reflecting surface and is successively reflected, along an optical path, by said first, second, third, fourth, second, first, fourth and third reflecting surfaces to again enter said laser medium, said laser medium being positioned with respect to said first and second reflecting apparatus so that three reflections occur without the laser beam emitted therefrom passing through the laser medium,
   wherein the laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and
   further having a polarization component adjusting device for dividing said laser beam into said P-polarization component and said S-polarization component at an arbitrary ratio, said polarization adjusting device being positioned in an optical path of said laser beam.

2. The self-compensating laser resonator according to claim 1, wherein an isolator, which allows said laser beam to pass in only one direction, is provided in an optical path of said laser beam.

3. The self-compensating laser resonator according to claim 1, wherein a partially reflective mirror used for laser output is provided at any one of said first to fourth reflecting surfaces.

4. The self-compensating laser resonator according to claim 1, wherein said polarization component adjusting device is a half wave plate.

5. The self-compensating laser resonator according to claim 1, wherein said polarization component adjusting device is a birefringent optical element capable of achieving a birefringence effect in accordance with an applied voltage.

6. The self-compensating laser resonator according to claim 1, having a Seeder light generating apparatus for making Seeder light incident upon said polarizing reflecting element, wherein said Seeder light is reflected onto an optional path of said laser beam.

7. The self-compensating laser resonator according to claim 1, further comprising a beam diameter converting device for converting a beam diameter of a laser beam.

8. The self-compensating laser resonator according to claim 1, wherein said first and second reflecting apparatuses each have two flat reflecting mirrors disposed at a right angle to each other.

9. The self-compensating laser resonator according to claim 8, wherein said two flat reflecting mirrors disposed at said right angle to each other are disposed with a gap therebetween and are joined to one another by a joining member.

10. The self-compensating laser resonator according to claim 1, wherein said first reflecting apparatus and said second reflecting apparatus each comprise a prism having two reflecting surfaces disposed at right angles to each other and an incident surface of the laser beam.

11. The self-compensating laser resonator according to claim 10, wherein said first and second ridge lines of the first and second prisms are eliminated.

12. The self-compensating laser of claim 1, wherein the laser beam emanating from said laser medium initially reflects from one of said first or second reflecting surface.

13. A self-compensating laser resonator comprising:
a first reflecting apparatus having a first reflecting surface and a second reflecting surface disposed at a right angle to each other and intersecting at a first ridge line;
a second reflecting apparatus having a third reflecting surface and a fourth reflecting surface disposed at a right angle to each other and intersecting at a second ridge line, said second reflecting apparatus facing said first reflecting apparatus such that the first through fourth reflecting surfaces are facing each other;
a laser medium provided between said first reflecting surface and said third reflecting surface; and
a light source for exciting said laser medium,
wherein the first ridge line is substantially orthogonal to the second ridge line where a laser beam emanating from said laser medium travels along an optical path to said first reflecting surface and is successively reflected, along an optical path, by said first, second, third, fourth, second, first, fourth and third reflecting surfaces to again enter said laser medium, said laser medium being positioned with respect to said first and second reflecting apparatus so that three reflections occur without the laser beam emitted therefrom passing through the laser medium,
an isolator for allowing said laser beam having said P-polarization component and said S-polarization component to pass in only one direction, said isolator having two polarization component adjusting devices for selectively allowing to pass a first portion of said P-polarization component and a second portion of said S-polarization component while reflecting the non-passed portions, a Faraday rotator and a half wave plate; and
a polarization component adjusting device for dividing said laser beam into said P-polarization component and said S-polarization component at an arbitrary ratio.

14. The self-compensating laser resonator according to claim 13, wherein said polarization component adjusting device is a half wave plate.

15. The self-compensating laser resonator according to claim 13, wherein said polarization component adjusting device is a birefringent effect in accordance with an applied voltage.

16. A self-compensating laser resonator according to claim 13, further comprising a Seeder light generating apparatus for making Seeder light incident in the optical path of a laser beam reflected from said polarizing reflecting element.

17. A self-compensating laser resonator comprising:
a first reflecting apparatus having a first reflecting surface and a second reflecting surface disposed at a right angle to each other;
a second reflecting apparatus having a third reflecting surface and a fourth reflecting surface disposed at a right angle to each other, said second reflecting apparatus facing said first reflecting apparatus such that the first through fourth reflecting surfaces are facing each other;
a third reflecting apparatus provided between said second and fourth reflecting surfaces, having a fifth reflecting surface and a sixth reflecting surface disposed parallel to, and facing away from, each other;
a laser medium provided between said first and third reflecting surfaces;
a light source for exciting said laser medium; and
a first ridge line formed by the intersection of said first and second reflecting surfaces and being substantially orthogonal to a second ridge line formed by the intersection of said third and fourth reflecting surfaces,
wherein a laser beam emanating from said laser medium travels along an optical path to said first reflecting surface and is successively reflected, along an optical path, by said first, second, third, fourth, fifth, fourth, third, second and first reflecting surfaces to again enter said laser medium, passes through said laser medium, and is further successively reflected by said third, fourth, first, second, sixth, second, first, fourth, and third reflecting surfaces to once again enter said laser medium,
wherein said laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and
further having a polarization component adjusting device for dividing said laser beam into said P-polarization component and said S-polarization component at an arbitrary ratio, said polarization adjusting device being positioned in an optical path of said laser beam.

18. The self-compensating laser resonator according to claim 17, wherein said third reflecting apparatus comprises two reflecting mirrors, each having a single reflective surface, mutually fixed by a holder and disposed such that the reflecting surfaces are parallel and face in opposite directions from each other.

19. The self-compensating laser resonator according to claim 17, wherein said third reflecting apparatus comprises a reflecting mirror having a two-sided reflective coating on a transparent substrate.

20. The self-compensating laser resonator according to claim 17, wherein said polarization component adjusting device is a half wave plate.

21. The self-compensating laser resonator according to claim 17, wherein said polarization component adjusting device is a birefringent optical element capable of achieving a birefringence effect in accordance with an applied voltage.

22. A self-compensating laser resonator according to claim 17, wherein a Seeder light generating apparatus for making Seeder light incident in the optical path of a laser beam reflected from said polarizing reflecting element is provided.

23. The self-compensating laser resonator according to claim 17, wherein said first and second reflecting apparatuses each have two flat reflecting mirrors disposed at a right angle to each other.

24. The self-compensating laser resonator according to claim 23, wherein said two flat reflecting mirrors disposed at a right angle to each other are disposed with a gap therebetween and are joined to one another by a joining member.

25. A self-compensating laser resonator comprising:

a first reflecting apparatus having a first reflecting surface and a second reflecting surface disposed at a right angle to each other;

a second reflecting apparatus having a third reflecting surface and a fourth reflecting surface disposed at a right angle to each other, said second reflecting apparatus facing said first reflecting apparatus such that the first through fourth reflecting surfaces are facing each other;

a laser medium having a seventh two-sided reflecting surface on an optical axis of said laser beam between said first and third reflecting surface;

a light source for exciting said laser medium; and a first ridge line formed by the intersection of said first and second reflecting surfaces, and being substantially orthogonal to a second ridge line formed by the intersection of said third and fourth reflecting surfaces, wherein a laser beam emanating from said laser medium travels along an optical path to said first reflecting surface and is successively reflected, along an optical path, by said first, second, third, fourth, second, first, fourth, third and seventh two-sided reflecting surfaces, is further successively reflected by said third, fourth, first, second, fourth, third, second and first reflecting surfaces to again enter said laser medium, passes through said laser medium and is reflected by said seventh two-sided reflecting surface, wherein said laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and further having a polarization component adjusting device for dividing said laser beam into said P-polarization component and said S-polarization component at an arbitrary ratio, said polarization adjusting device being positioned in an optical path of said laser beam.

26. A self-compensating laser resonator comprising:

a first reflecting apparatus having a first reflecting surface and a second reflecting surface disposed at a right angle to each other;

a second reflecting apparatus and having a third reflecting surface and a fourth reflecting surface disposed at a right angle to each other, said second reflecting apparatus facing said first reflecting apparatus such that the first through fourth reflecting surfaces are facing each other;

a laser medium provided between said first and third reflecting surfaces;

a light source for exciting said laser medium;

an optical component having an eighth two-sided reflecting surface on an optical axis of said laser beam on one end surface thereof provided between second and fourth reflecting surfaces; and a first ridge line formed by the intersection of said first and second reflecting surfaces, and being substantially orthogonal to a second ridge line formed by the intersection of said third and fourth reflecting surfaces, wherein a laser beam emanating from said laser medium travels along an optical path to said first reflecting surfaces and is successively reflected, along and optical path, by said first, second, third, fourth, eighth two-sided, fourth, third, second and first reflecting surfaces to again enter said laser medium, passes through said laser medium, is further successively reflected, along an optical path, by said third, fourth, first and second reflecting surfaces to be incident on said optical component, and is further successively reflected, along an optical path, by said eighth two-sided, second, first, fourth, and third reflecting surfaces to once again enter the laser medium, wherein said laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and further having a polarization component adjusting device for dividing said laser beam into said P-polarization component and said S-polarization component at an arbitrary ratio, said polarization adjusting device being positioned in an optical path of said laser beam.

27. A self-compensating laser resonator comprising:

a first prism having first and second reflecting surfaces disposed at right angles to each other and a first incident surface on said first prism, upon which said laser beam is incident;

a second prism having third and fourth reflecting surfaces disposed at right angles to each other and a second incident surface upon which said laser beam is incident on said second prism, wherein the first through fourth reflecting surfaces face each other, a ninth two-sided reflecting surface on an optical path of the laser beam, wherein said ninth two-sided reflecting surface is on the second incident surface;

a laser medium provided between said first and third reflecting surface;

a light source for exciting said laser medium; and a ridge line formed by the intersection of said first and second reflecting surfaces, and being substantially orthogonal to a second ridge line formed by the intersection of said third and fourth reflecting surfaces, wherein a laser beam emanating from the laser medium travels along an optical path to said first reflecting surface and is successively reflected, along an optical path by the first, second, third, fourth, second, first, ninth two-sided, first, second, fourth, third, second, and first reflecting surfaces to again enter the laser medium, passes through the laser medium, and is further successively reflected along an optical path by the third, fourth, ninth two-sided, fourth and third reflecting surfaces to once again enter the laser medium, wherein said laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and further having a polarization component adjusting device for dividing said laser beam into said P-polarization component and said S-polarization component at an arbitrary ratio, said polarization adjusting device being positioned in an optical path of said laser beam.

28. The self-compensating laser resonator according to claim 27, wherein said first and second ridge lines of the first and second prisms are eliminated.

29. A self-compensating laser resonator comprising:

a first reflecting apparatus having a first reflecting surface and a second reflecting surface disposed at a first predetermined angle to each other and intersecting at a first ridge line;

a second reflecting apparatus having a third reflecting surface and a fourth reflecting surface disposed at a second predetermined angle to each other and intersecting at a second ridge line, said second reflecting apparatus facing said first reflecting apparatus such that the first through fourth reflecting surfaces are facing each other;

a laser medium provided between said first reflecting surface and said third reflecting surface; and a light source for exciting said laser medium, wherein the first ridge line is substantially orthogonal to the second ridge line where a laser beam emanating from said laser medium travels along an optical path to said first reflecting surface and is successively reflected, along an optical path, by said first, second, third, fourth, second, first, fourth and third reflecting surfaces to again enter said laser medium, said laser medium being positioned with respect to said first and second reflecting apparatus so that three reflections occur without the laser beam emitted therefrom passing through the laser medium, wherein said laser beam contains a P-polarization and an S-polarization component, said resonator further having a polarizing reflecting element for selectively allowing to pass a first portion of said P-polarization component and a second portion of said S-polarization component, where the non-passed portions are reflected, said polarizing reflecting element positioned in an optical path of said laser beam, and further having a polarization component adjusting device for dividing said laser beam into said P-polarization component and said S-polarization component at an arbitrary ratio, said polarization adjusting device being positioned in an optical path of said laser beam.

* * * * *